United States Patent
Yamakado et al.

(10) Patent No.: US 8,989,981 B2
(45) Date of Patent: Mar. 24, 2015

(54) VEHICLE MOTION CONTROL DEVICE

(71) Applicant: Hitachi Automotive Systems, Ltd., Hitachinaka-shi, Ibaraki (JP)

(72) Inventors: Makoto Yamakado, Tsuchiura (JP); Shinjiro Saito, Kasumigaura (JP); Atsushi Yokoyama, Tokyo (JP); Junya Takahashi, Hitachinaka (JP); Tatsuya Yoshida, Naka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/248,863

(22) Filed: Apr. 9, 2014

(65) Prior Publication Data

US 2014/0222309 A1     Aug. 7, 2014

Related U.S. Application Data

(63) Continuation of application No. 13/395,015, filed as application No. PCT/JP2010/062996 on Aug. 2, 2010, now abandoned.

(30) Foreign Application Priority Data

Sep. 30, 2009   (JP) .................................. 2009-225938

(51) Int. Cl.
  *B60T 8/24*       (2006.01)
  *B60W 10/04*    (2006.01)
  (Continued)

(52) U.S. Cl.
  CPC .............. *B60W 10/04* (2013.01); *B60T 8/1755* (2013.01); *B60W 10/08* (2013.01); *B60W 10/18* (2013.01);
  (Continued)

(58) Field of Classification Search
  CPC ............. B60T 8/1755; B60T 2230/02; B60W 2720/14; B60W 30/045; B60W 2520/125

USPC .............................. 701/36, 70, 89, 79, 69, 72
See application file for complete search history.

(56) References Cited

U.S. PATENT DOCUMENTS

| 5,893,896 A | 4/1999 | Imamura et al. |
| 5,960,376 A | 9/1999 | Yamakado et al. |

(Continued)

FOREIGN PATENT DOCUMENTS

| EP | 1 179 464 A2 | 2/2002 |
| EP | 1 522 475 A2 | 4/2005 |

(Continued)

OTHER PUBLICATIONS

Yamakado et al., "Improvement of Vehicle Agility and Stability by G-Vectoring Control", Proc. of AVEC2008-080420, pp. 116-121 (six (6) sheets).

(Continued)

*Primary Examiner* — Calvin Cheung
*Assistant Examiner* — Courtney Heinle
(74) *Attorney, Agent, or Firm* — Crowell & Moring LLP

(57) ABSTRACT

There is provided a vehicle drive control system that feels less unnatural and that enables an improvement in safety performance. A vehicle motion control system capable of independently controlling a driving force and a braking force of four wheels comprises: a first mode (G-Vectoring control) in which substantially the same driving force and braking force are generated with respect to left and right wheels among the four wheels based on a longitudinal acceleration/deceleration control command that is coordinated with the vehicle's lateral motion; and a second mode (sideslip prevention control) in which different driving forces and braking forces are generated with respect to the left and right wheels among the four wheels based on a target yaw moment derived from the vehicle's sideslip information, wherein the first mode is selected when the target yaw moment is equal to or less than a predefined threshold, and the second mode is selected when the target yaw moment is greater than the threshold.

16 Claims, 20 Drawing Sheets

(51) Int. Cl.
- *B60T 8/1755* (2006.01)
- *B60W 10/08* (2006.01)
- *B60W 10/18* (2012.01)
- *B60W 10/184* (2012.01)
- *B60W 30/045* (2012.01)
- *B60W 10/119* (2012.01)

(52) U.S. Cl.
CPC ............ *B60W 10/184* (2013.01); *B60W 30/045* (2013.01); *B60W 10/119* (2013.01); *B60T 2270/302* (2013.01); *B60W 2720/14* (2013.01); *B60W 2720/30* (2013.01)
USPC .............................................. 701/72; 701/69

(56) References Cited

U.S. PATENT DOCUMENTS

| | | |
|---|---|---|
| 6,205,391 B1 | 3/2001 | Ghoneim et al. |
| 2006/0041364 A1 | 2/2006 | Tsukasaki et al. |
| 2008/0172153 A1 | 7/2008 | Ozaki et al. |
| 2009/0054202 A1 | 2/2009 | Yamakado et al. |
| 2009/0102145 A1* | 4/2009 | Moriki et al. ............... 280/5.507 |
| 2009/0112404 A1 | 4/2009 | Imura et al. |
| 2009/0171526 A1 | 7/2009 | Takenaka et al. |
| 2009/0192675 A1 | 7/2009 | Yamakado et al. |
| 2010/0055649 A1 | 3/2010 | Takahashi et al. |
| 2010/0174463 A1* | 7/2010 | Uragami et al. ................. 701/70 |
| 2010/0250083 A1 | 9/2010 | Takahashi et al. |
| 2012/0053791 A1 | 3/2012 | Harada |

FOREIGN PATENT DOCUMENTS

| | | |
|---|---|---|
| EP | 1 650 096 A2 | 4/2006 |
| EP | 1 657 138 A1 | 5/2006 |
| JP | 9-315277 A | 12/1977 |
| JP | 5-16789 A | 1/1993 |
| JP | 7-52629 A | 2/1995 |
| JP | 2002-340925 | 11/2002 |
| JP | 2005-96710 A | 4/2005 |
| JP | 2005-306285 A | 11/2005 |
| JP | 2008-290720 A | 12/2008 |
| JP | 2009-107447 A | 5/2009 |

OTHER PUBLICATIONS

Yamakado et al., "Proposal of the longitudinal driver model in coordination with vehicle lateral motion based upon jerk information", Review of Automotive Engineering, vol. 29, No. 4, Oct. 2008, pp. 533-541 (nine (9) sheets).

Inagaki et al., "Analysis on Vehicle Stability in Critical Cornering Using Phase-Plane Method", Proc. of AVEC1994-9438411, pp. 287-292 (six (6) sheets).

International Search Report with English translation dated Nov. 2, 2010 (seven (7) sheets).

European Search Report dated May 8, 2014 (three pages).

* cited by examiner

Fig. 9

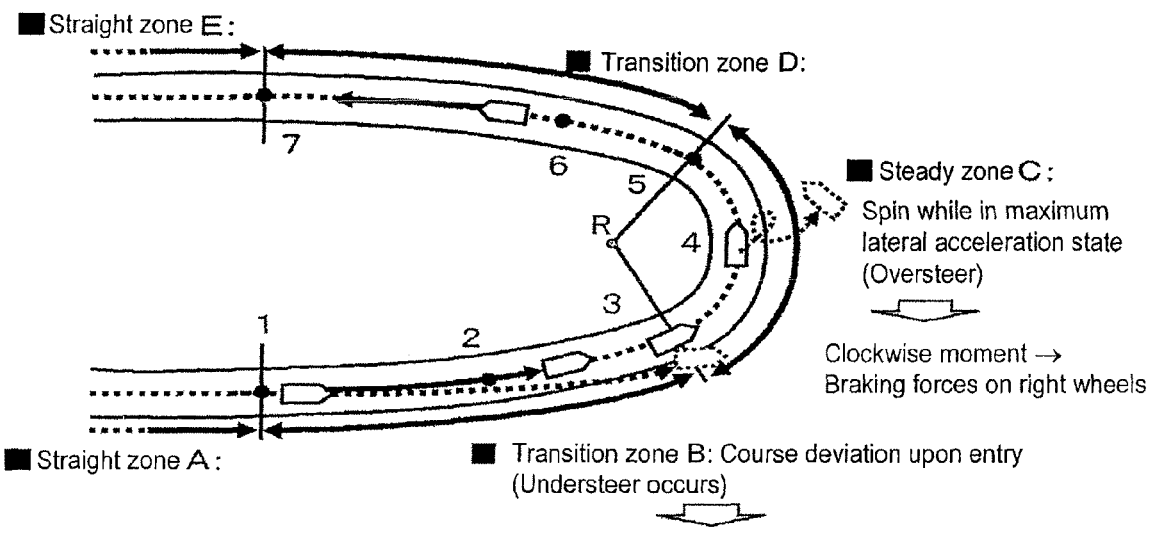

■ Straight zone E:
■ Transition zone D:
■ Steady zone C:
  Spin while in maximum lateral acceleration state (Oversteer)

Clockwise moment →
  Braking forces on right wheels

■ Straight zone A:
■ Transition zone B: Course deviation upon entry (Understeer occurs)

Anti-clockwise moment → Braking force on left rear wheel

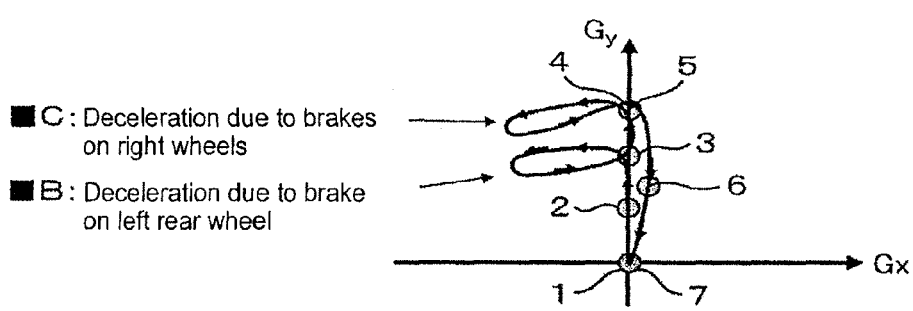

■ C: Deceleration due to brakes on right wheels
■ B: Deceleration due to brake on left rear wheel

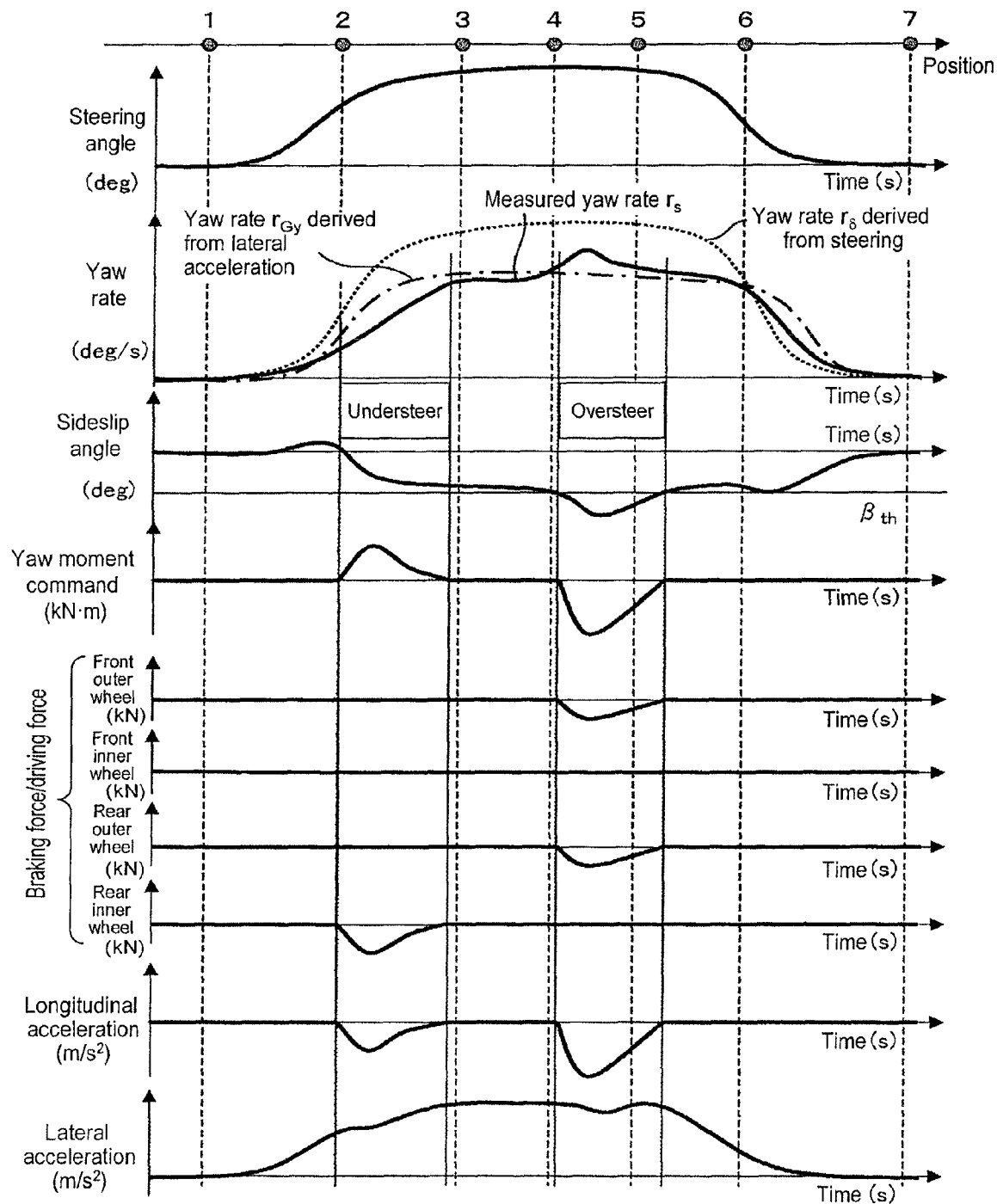

VEHICLE MOTION CONTROL DEVICE

CROSS REFERENCE TO RELATED APPLICATIONS

This application is a continuation of U.S. application Ser. No. 13/395,015, filed Mar. 8, 2012, which is National Stage application of PCT/JP2010/062996, filed Aug. 2, 2010, which claims priority from Japanese Patent Application 2009-225938, filed on Sep. 30, 2009, the disclosures of which are expressly incorporated by reference herein.

TECHNICAL FIELD

The present invention relates to a vehicle motion control system capable of controlling the driving forces and braking forces of four wheels.

BACKGROUND ART

A command value for automatically performing acceleration/deceleration that is coordinated with steering operations is disclosed, for example, in Non-Patent Document 1 ((Eq. 1)).

[Eq. 1]

$$G_{xc} = -sgn(G_y \cdot \dot{G}_y) \frac{C_{xy}}{1+Ts} |\dot{G}_y| + G_{x\_DC} \quad \text{(Eq. 1)}$$

$$(\text{※ } G_y = \dot{G}_{y\_dot})$$

This is basically a simple control rule where lateral jerk $G_y\_$dot is multiplied by gain $C_{xy}$, and a value to which a first-order lag is imparted is taken to be longitudinal acceleration/deceleration control command $G_{xc}$ (equivalent to target longitudinal acceleration/deceleration control command ($G_{xt}$)). It is confirmed in Non-Patent Document 2 that an expert driver's coordinated control strategy for lateral and longitudinal motions may thus be partially simulated. $G_{x\_DC}$ in the equation above is a deceleration component that is not coordinated with lateral motion. It is a term that is required in cases where there is anticipatory deceleration when a corner is ahead or where there is a zone speed command. Further, the sgn (signum) term is a term provided so that the operation above may be attained with respect to both right corners and left corners. Specifically, an operation may be attained where deceleration is performed at turn-in upon starting steering, deceleration is suspended once at steady turn (since lateral jerk becomes zero), and acceleration is performed upon starting to ease steering when exiting the corner.

When thus controlled, with respect to a diagram in which the horizontal axis represents the longitudinal acceleration of a vehicle and the vertical axis the lateral acceleration of the vehicle, the combined acceleration (denoted by G) of longitudinal acceleration and lateral acceleration is so oriented (vectored) as to transition in a curved manner with the passage of time. It is therefore called "G-Vectoring control."

In addition, with respect to a sideslip prevention system for improving safety performance at the critical driving region, it is reported in Non-Patent Document 3 that because it becomes unstable (divergent) when vehicle behavior transitions to a region in a phase plane for vehicle sideslip angle β and vehicle sideslip angular speed (β_dot) that is apart from the origin and where the signs of β and β_dot are the same (the first and third quadrants), it is effective when used in the determination for activating the sideslip prevention system. It is disclosed that the vehicle is stabilized by applying different brake hydraulic pressures on the left and right wheels based on sideslip information, generating decelerating forces that differ between the left and the right, and generating a yaw moment in a direction in which the sideslip angle becomes smaller.

Non-Patent Document 1: M. Yamakado, M. Abe. Improvement of Vehicle Agility and Stability by G-Vectoring Control, Proc. of AVEC2008-080420.

Non-Patent Document 2: M. Yamakado, M. Abe: Proposal of the longitudinal driver model in coordination with vehicle lateral motion based upon jerk information, Review of Automotive Engineering, Vol. 29. No. 4. October 2008, P. 533~541.

Non-Patent Document 3: S. Inagaki, I. Kushiro, M. Yamamoto: Analysis on Vehicle Stability in Critical Cornering Using Phase-Plane Method, Proc. of AVEC1994-9438411

DISCLOSURE OF THE INVENTION

Problems to be Solved by the Invention

It is indicated in Non-Patent Documents 1 and 2 that this control method is extracted from brake and accelerator operations corresponding to steer operations that an expert driver performs voluntarily, and that there is a possibility that it would not feel unnatural even if there is automatic intervention from a normal region, and improvements in the mechanical rationality, maneuverability, and stability of this control method are presented as simulation results. This means that because acceleration/deceleration is controlled in a coordinated manner so that the behavior of the vehicle would respond appropriately to the driver's steering operation, it is consequently possible to prevent the sideslip angle of the vehicle from becoming large. In particular, it is effective in reducing so-called "understeer" where the turning radius becomes too large relative to steering.

On the other hand, this control does not guarantee that, should the sideslip angle inadvertently become large for some reason, it will be reduced for certain. By way of example, if the vehicle lateral motion stabilizes while in a drifting state where the sideslip angle has become large, lateral acceleration becomes constant, and lateral jerk becomes zero. As a result, the acceleration/deceleration control command represented by (Eq. 1) becomes zero, and a stable state is entered while the vehicle is still drifting. Although stable mechanically, there is no guarantee that driving that does not feel unnatural to any driver is attained.

In addition, although the sideslip prevention system disclosed in Non-Patent Document 3 operates based on sideslip information, no guidance is provided with respect to operating from the normal region where there is little or no sideslip. Further, from the perspective of "understeer" prevention, which is a forte of "G-Vectoring control," it would mean that the "sideslip prevention system" is such that a moment is introduced only after sideslip has occurred to some significant extent. Thus, control tends to be after the fact, requiring a large moment to reduce understeer. As a result, there are concerns that the understeer reducing effect would become smaller, while causing an unnatural feel due to excessive deceleration.

In addition, no consideration is given to the deceleration that occurs when the sideslip prevention system generates a yaw moment. Thus, the moment to be generated is determined first, and the vehicle's acceleration/deceleration is determined by the combined force of the left and right braking forces. Given the above, it cannot be said that acceleration/deceleration is coordinated with lateral motion.

An object of the present invention is to provide a vehicle drive control system that reliably reduces sideslip in the critical driving region, feels less unnatural, and enables an improvement in safety performance.

Means for Solving the Problems

With a view to attaining the object above, the present invention is a vehicle motion control system capable of independently controlling driving forces and braking forces of four wheels, comprising: a first mode in which substantially the same driving force and braking force are generated with respect to left and right wheels among the four wheels based on a longitudinal acceleration/deceleration control command that is coordinated with a lateral motion of the vehicle; and a second mode in which different driving forces and braking forces are generated with respect to the left and right wheels among the four wheels based on a target yaw moment derived from sideslip information of the vehicle, wherein the first mode is selected when the target yaw moment is equal to or less than a predefined threshold, and the second mode is selected when the target yaw moment is greater than the threshold.

Effects of the Invention

A vehicle drive control system that feels less unnatural and enables an improvement in safety performance may be provided.

The present specification incorporates the contents of the specification and/or drawings of JP Patent Application No. 2009-225938 from which the present application claims priority.

BRIEF DESCRIPTION OF THE DRAWINGS

FIG. 9 is a diagram showing a process from entry to exit for a left corner with respect to a sideslip prevention controlled vehicle of the present invention.

FIG. 10 shows charts indicating time series data from when the travel path in FIG. 9 is traveled.

LIST OF REFERENCE NUMERALS

Figure 1:
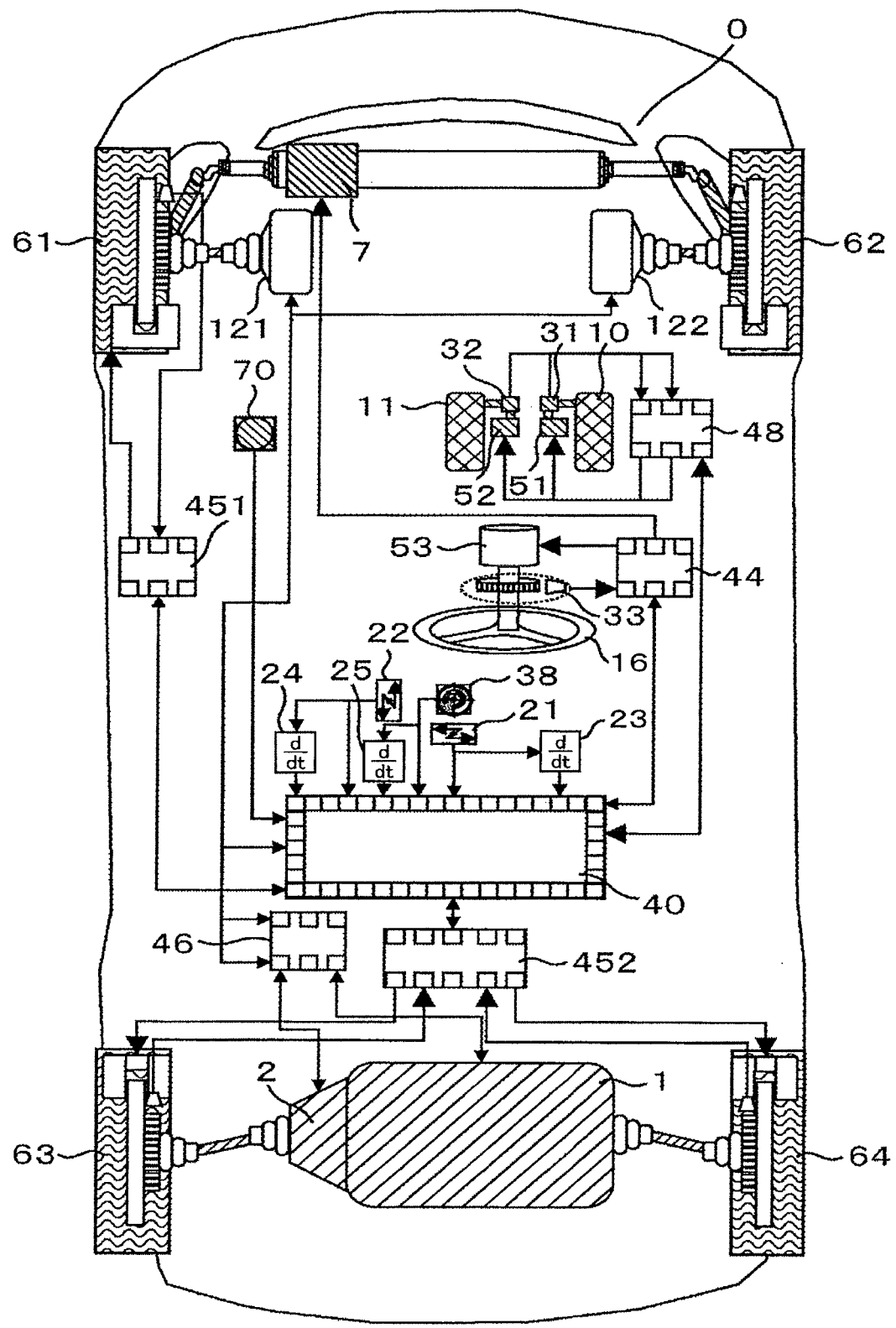
FIG. 1 is a diagram showing the overall configuration of a vehicle motion control system according to the present invention.

0 Vehicle
1 Motor
2 Driving force distribution mechanism
7 Power steering
10 Accelerator pedal
11 Brake pedal
16 Steering
21 Lateral acceleration sensor
22 Longitudinal acceleration sensor
23, 24, 25 Differentiating circuit
31 Accelerator sensor
32 Brake sensor
33 Steering angle sensor
38 Yaw rate sensor
40 Central controller
44 Steering controller
46 Power train controller
48 Pedal controller
51 Accelerator reaction motor
52 Brake reaction motor
53 Steering reaction motor
61 Left front wheel
62 Right front wheel
63 Left rear wheel
64 Right rear wheel
70 Millimeter wave vehicle ground speed sensor
81 Control selector
82 Multi-information display
121 Left front wheel motor
122 Right front wheel motor
451, 452 Brake controller

BEST MODES FOR CARRYING OUT THE INVENTION

The overall configuration of an embodiment of a vehicle motion control system of the present invention is shown in FIG. 1.

In the present embodiment, a vehicle 0 is of a so-called by-wire system, and there is no mechanical link between the driver and the steering mechanism, acceleration mechanism and deceleration mechanism.

<Driving>

The vehicle 0 is a four-wheel-drive vehicle (All Wheel Drive: AWD vehicle) that drives a left rear wheel 63 and a right rear wheel 64 with a motor 1, while driving a left front wheel 61 with a left front wheel motor 121, and a right front wheel 62 with a right front wheel motor 122. A driving force distribution mechanism 2 capable of freely distributing the torque of the motor across the left and right wheels is so mounted as to be connected with the motor 1. Differences in power source, e.g., electric motors, internal combustion engines, etc., are not particularly relevant to the present invention. As a most suitable example representing the present invention, and by being combined with the later-discussed four-wheel independent brake, the configuration is such that the driving forces and braking forces of the four wheels are freely controllable. The configuration is presented in detail below.

The left front wheel 61, the right front wheel 62, the left rear wheel 63, and the right rear wheel 64 are each equipped with a brake rotor, a wheel speed sensing rotor, and, on the vehicle-side, a wheel speed pickup, thereby providing a configuration that allows the wheel speed of each wheel to be sensed. Then, the amount by which the driver steps on an accelerator pedal 10 is sensed by an accelerator position sensor 31, and is processed at a central controller 40, which is a vehicle motion control system, via a pedal controller 48. This processing includes therein torque distribution information that is in accordance with "sideslip prevention control" as an object of the present invention. Then, in accordance with this amount, a power train controller 46 controls the outputs of the motor 1, the left front wheel motor 121, and the right front wheel motor 122. In addition, the output of the motor 1 is distributed across the left rear wheel 63 and the right rear wheel 64 at the optimal ratio via the driving force distribution mechanism 2, which is controlled by the power train controller 46.

An accelerator reaction motor 51 is also connected to the accelerator pedal 10, and reactions are controlled by the pedal controller 48 based on a computed command of the central controller 40.

It is noted that the central controller 40, which is a vehicle motion control system, is a vehicle motion control system capable of independently controlling the driving forces and braking forces of the four wheels.

<Braking>

The left front wheel 61, the right front wheel 62, the left rear wheel 63, and the right rear wheel 64 are each equipped with a brake rotor, and, on the vehicle-side, a caliper that decelerates the wheel by pinching the brake rotor with pads (not shown). The caliper is hydraulic, or electric with an electric motor for each caliper.

Each caliper is controlled by a brake controller 451 (for the front wheels) or 452 (for the rear wheels) based generally on a computed command of the central controller 40.

A brake reaction motor 52 is also connected to the brake pedal 11, and reactions are controlled by the pedal controller 48 based on a computed command of the central controller 40.

<Integrated Control of Braking and Driving>

With the present invention, braking forces and driving forces that differ between the left and right wheels would be generated based on sideslip angle information, however, what contributes as a yaw moment is the difference between the left and right braking forces or driving forces. Accordingly, in order to create this difference, there may be unordinary operations, such as driving one side while braking the other. An integrated control command under such circumstances is such that a command is determined in an integrated manner by the central controller 40 and appropriately controlled via the brake controllers 451 (for the front wheels) and 452 (for the rear wheels), the power train controller 46, the motor 1, and the driving force distribution mechanism 2.

<Steering>

The steering system of the vehicle 0 is of a steer-by-wire structure where there is no mechanical link between the driver's steering angle and the tire turning angle. It comprises power steering 7, which includes therein a steering angle sensor (not shown), steering 16, a driver steering angle sensor 33, and a steering controller 44. The amount by which the driver steers the steering 16 is sensed by the driver steering angle sensor 33, and is processed at the central controller 40 via the steering controller 44. In accordance with this amount, the steering controller 44 then controls the power steering 7.

A steer reaction motor 53 is also connected to the steering 16, and reactions are controlled by the steering controller 44 based on a computed command of the central controller 40.

The amount by which the driver steps on the brake pedal 11 is sensed by a brake pedal position sensor 32, and is processed at the central controller 40 via the pedal controller 48.

<Sensors>

A group of motion sensors of the present invention are next discussed. With respect to sensors that measure the motion of the vehicle in the present embodiment, there are provided an absolute vehicle speed meter, a yaw rate sensor, an acceleration sensor, etc. In addition to the above and at the same time, vehicle speed and yaw rate are estimated with a wheel speed sensor, yaw rate and lateral acceleration are estimated using vehicle speed, steering angle, and vehicle motion models, and so forth.

The vehicle 0 is equipped with a millimeter wave vehicle ground speed sensor 70, and longitudinal speed $V_x$ and lateral speed $V_y$ may be sensed independently. In addition, the wheel speed of each wheel is inputted to the brake controller 451 or 452 as mentioned above. Based on the wheel speeds of the four wheels, the absolute vehicle speed may be estimated by averaging the wheel speeds of the front wheels (non-driven wheels). With respect to the present invention, the configuration is such that the absolute vehicle speed ($V_x$) is measured accurately, even in cases where all four wheels decrease in wheel speed at the same time, by using the method disclosed in JP Patent Application Publication (Kokai) No. 5-16789 A (1993) and adding signals of the wheel speeds and of an acceleration sensor that senses the vehicle's longitudinal acceleration. In addition, it also incorporates a feature that estimates the yaw rate of the vehicle body by obtaining the difference between the left and right wheel speeds of the front wheels (non-driven wheels), thereby improving the robustness of sensing signals.

These signals are then constantly monitored within the central controller 40 as shared information. The configuration is such that the estimated absolute vehicle speed is compared and referenced against the signal of the millimeter wave vehicle ground speed sensor 70, and each complements the other if some anomaly were to occur in either of the signals.

As shown in FIG. 1, the lateral acceleration sensor 21, the longitudinal acceleration sensor 22, and the yaw rate sensor 38 are disposed near the center of gravity. In addition, there are provided differentiating circuits 23 and 24 which obtain jerk information by differentiating the outputs of their respective acceleration sensors. There is further provided a differentiating circuit 25 for obtaining a yaw angular acceleration signal by differentiating the sensor output of the yaw rate sensor 38.

In the present embodiment, in order to make the presence of the differentiating circuits clear, each sensor is shown to be provided with one. However, in reality, acceleration signals may be inputted directly to the central controller 40, and differentiation processes may be performed after various processes have been performed. Thus, using the yaw rate estimated based on the above-mentioned wheel speed sensors, the yaw angular acceleration of the vehicle body may be obtained by performing a differentiation process within the central controller 40.

In addition, although acceleration sensors and differentiating circuits are used in order to obtain jerk, the jerk sensor disclosed in JP Patent Application No. 2002-39435 may be used instead.

In addition, the present embodiment also employs a method of estimating lateral acceleration and lateral jerk. A method of estimating lateral acceleration estimated value $G_{ye}$ and lateral jerk estimated value $G_{ye}\_$dot based on steering angle δ is discussed using FIG. 2.

First, with respect to a vehicle lateral motion model, with steering angle δ [deg] and vehicle speed V [m/s] as input, yaw rate r during a steady circular turn disregarding dynamic characteristics is calculated as follows (Eq. 2).

[Eq. 2]
$$r = \frac{1}{1+AV^2}\frac{V}{l}\delta \quad (\text{Eq. 2})$$

With respect to the equation above, stability factor A and wheel base l are parameters unique to the vehicle, and are empirically derived constant values. In addition, lateral acceleration $G_y$ of the vehicle may be represented through the following equation, (Eq. 3), where V is the vehicle speed, β_dot the rate of change in the vehicle's sideslip angle, and r the yaw rate.

[Eq. 3]
$$G_y = V(\dot{\beta}+r) \approx V \cdot r \; (\times \dot{\beta} = \beta\_dot) \quad (\text{Eq. 3})$$

β_dot is a motion within the linear range of tire force, and is a quantity that may be omitted as being negligible. Here, lateral acceleration $G_{ye\_wod}$ is calculated by multiplying yaw rate r, for which dynamic characteristics have been disregarded as mentioned earlier, by vehicle speed V. This lateral acceleration does not take into account the dynamic characteristics of the vehicle having response lag characteristics in the low frequency region. This is for the following reason. In order to obtain lateral jerk information $G_y\_$dot of the vehicle, time-discrete differentiation needs to be performed on lateral acceleration $G_y$.

In so doing, the noise component of the signal is reinforced. In order to use this signal for control, it has to be passed through a low-pass filter (LPF), which would, however, cause a phase lag. As such, a decision was made to derive jerk by employing a method where acceleration with an earlier phase than the actual acceleration, and for which dynamic characteristics are disregarded, is calculated, and passed through an LPF with time constant $T_{lpfe}$ after undergoing discrete differentiation. Another way of looking at the above is that the lag caused by the LPF represents the dynamic characteristics of lateral acceleration, and the acceleration thus derived is simply differentiated. Lateral acceleration $G_y$ is also passed through an LPF with the same time constant $T_{lpf}$. This would be equivalent to having dynamic characteristics imparted to acceleration as well, and, although not shown in the drawings, it has been confirmed that in the linear range, actual acceleration response is favorably represented.

A method in which lateral acceleration and lateral jerk are thus calculated using the steering angle is advantageous in that the influence of noise is suppressed, while reducing the response lag of lateral acceleration and lateral jerk.

However, since this estimation method omits sideslip information of the vehicle and ignores non-linear characteristics of tires, should the sideslip angle become significant, it would be necessary to measure and utilize the actual lateral acceleration of the vehicle.

Figure 3:
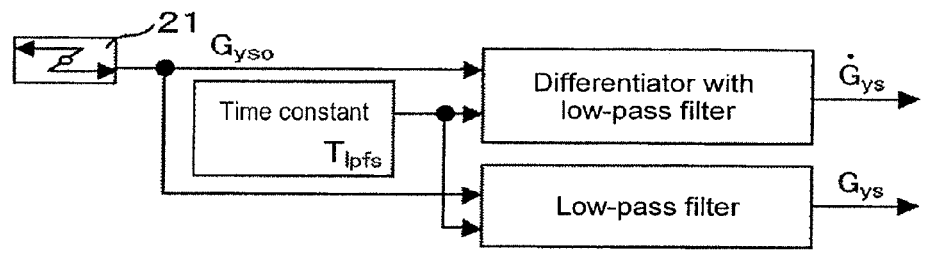
FIG. 3 is a diagram showing lateral acceleration and lateral jerk estimation using an acceleration sensor of the present invention.

FIG. 3 shows a method of obtaining lateral acceleration $G_{ys}$ and lateral jerk information $G_{ys}\_$dot for control using sensed signal $G_{yso}$ of the lateral acceleration sensor 21. Since it contains noise components, e.g., bumps on the road surface, etc., the sensor signal also needs to be passed through a low-pass filter (time constant $T_{lpfs}$) (not for dynamics compensation).

Figure 4:
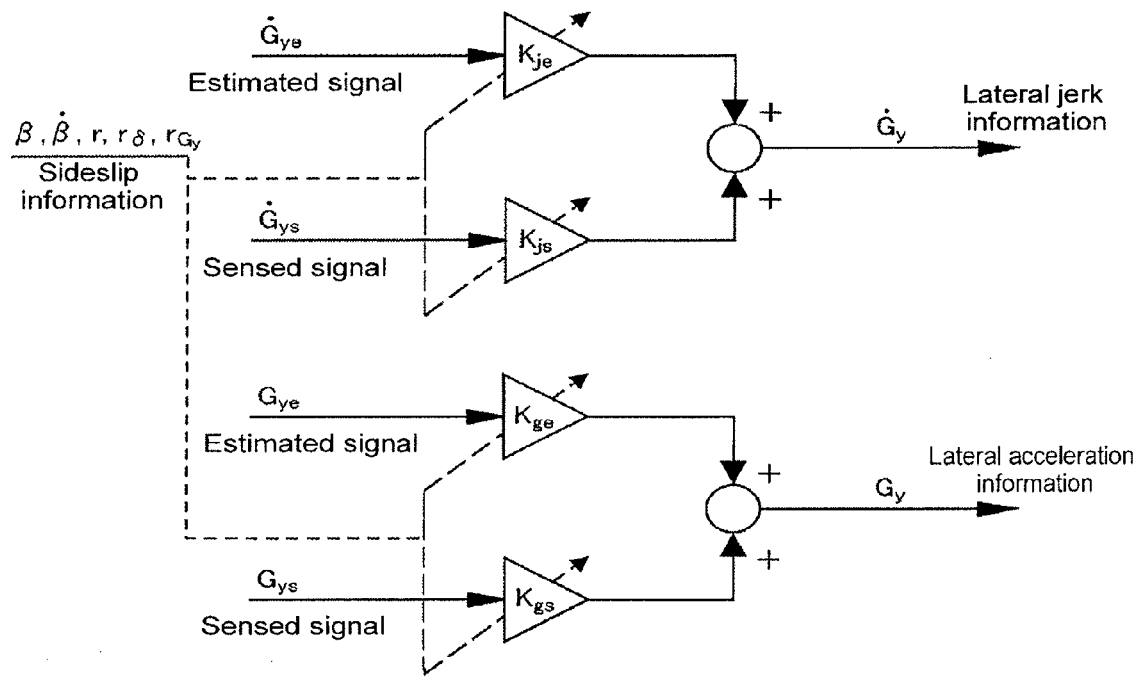
FIG. 4 is a diagram showing a concept of the present invention where estimated signals and measured signals complement each other.

In order to balance the above-discussed respective merits of estimating and of measuring lateral acceleration and jerk, in the present embodiment, a method is employed where both signals are used in a complementary fashion as shown in FIG. 4. An estimated signal (indicated with the index "e" for "estimated") and a sensed signal (indicated with the index "s" for "sensed") are to be multiplied by a gain, which varies based on sideslip information (sideslip angle β, yaw rate r, etc.), and added.

This variable gain $K_{je}$ (where $K_{je}<1$) with respect to lateral jerk estimated signal $G_{ye}\_$dot is so varied as to assume a greater value in a region where the sideslip angle is small, and to assume a smaller value as sideslip increases.

In addition, variable gain $K_{js}$ (where $K_{js}<1$) with respect to lateral jerk sensed signal $G_{ys}\_$dot is so varied as to assume a smaller value in a region where the sideslip angle is small, and to assume a greater value as sideslip increases.

Similarly, variable gain $K_{ge}$ (where $K_{ge}<1$) with respect to lateral acceleration estimated signal $G_{ye}$ is so varied as to assume a greater value in a region where the sideslip angle is small, and to assume a smaller value as sideslip increases. In addition, variable gain $K_{gs}$ (where $K_{gs}<1$) with respect to lateral acceleration sensed signal $G_{ys}$ is so varied as to assume a smaller value in a region where the sideslip angle is small, and to assume a greater value as sideslip increases.

By adopting such a configuration, there is provided a configuration in which noise is low in regions ranging from the normal region where the sideslip angle is small and up to the critical region where sideslip has become significant, and in which acceleration and jerk signals suitable for control may be obtained. It is noted that these gains are determined through a sideslip information function or map.

A system configuration and a method of estimating lateral acceleration and lateral jerk according to the first embodiment of the present invention have thus far been discussed (and these are incorporated as logic within the central controller 40). Hereinbelow, a "longitudinal acceleration/deceleration control command coordinated with lateral motion" and a "yaw moment control command calculated derived from sideslip information of the vehicle" are discussed.

<Longitudinal Acceleration/Deceleration Control Command Coordinated with Lateral Motion: G-Vectoring>

An outline of acceleration/deceleration control coordinated with lateral motion is, for example, presented in Non-Patent Document 1.

It is basically a simple control rule where lateral jerk $G_y\_dot$ is multiplied by gain $C_{xy}$, and a value to which a first-order lag is imparted is taken to be a longitudinal acceleration/deceleration control command. It is confirmed in Non-Patent Document 2 that a lateral and longitudinal motion coordinated control strategy of an expert driver may thus be partially simulated.

$G_{x\_DC}$ in (Eq. 1) is a deceleration component that is not coordinated with lateral motion (an acceleration/deceleration command that is inputted by the driver or automatically based on external information). It is a term that is required in cases where there is anticipatory deceleration when a corner is ahead or where there is a zone speed command. It is noted that longitudinal acceleration/deceleration control command $G_{xc}$ is equivalent to target longitudinal acceleration/deceleration control command $G_{xt}$.

Further, the sgn (signum) term is a term provided so that the operation above may be attained with respect to both right corners and left corners. Specifically, an operation may be attained where deceleration is performed at turn-in upon starting steering, deceleration is suspended once at steady turn (since lateral jerk becomes zero), and acceleration is performed upon starting to ease steering when exiting the corner. Accelerating/decelerating in accordance with lateral jerk may be construed as decelerating when lateral acceleration increases and accelerating when lateral acceleration decreases.

Further, drawing on (Eq. 2) and (Eq. 3), it may also be construed to mean that the vehicle decelerates when the steering angle increases, and that the vehicle accelerates when the steering angle decreases.

When thus controlled, with respect to a diagram whose horizontal axis represents the longitudinal acceleration of the vehicle and the vertical axis the lateral acceleration of the vehicle, the combined acceleration (denoted by G) of longitudinal acceleration and lateral acceleration is so oriented (vectored) as to transition in a curved manner with the passage of time. It is therefore called "G-Vectoring control."

Figure 5:
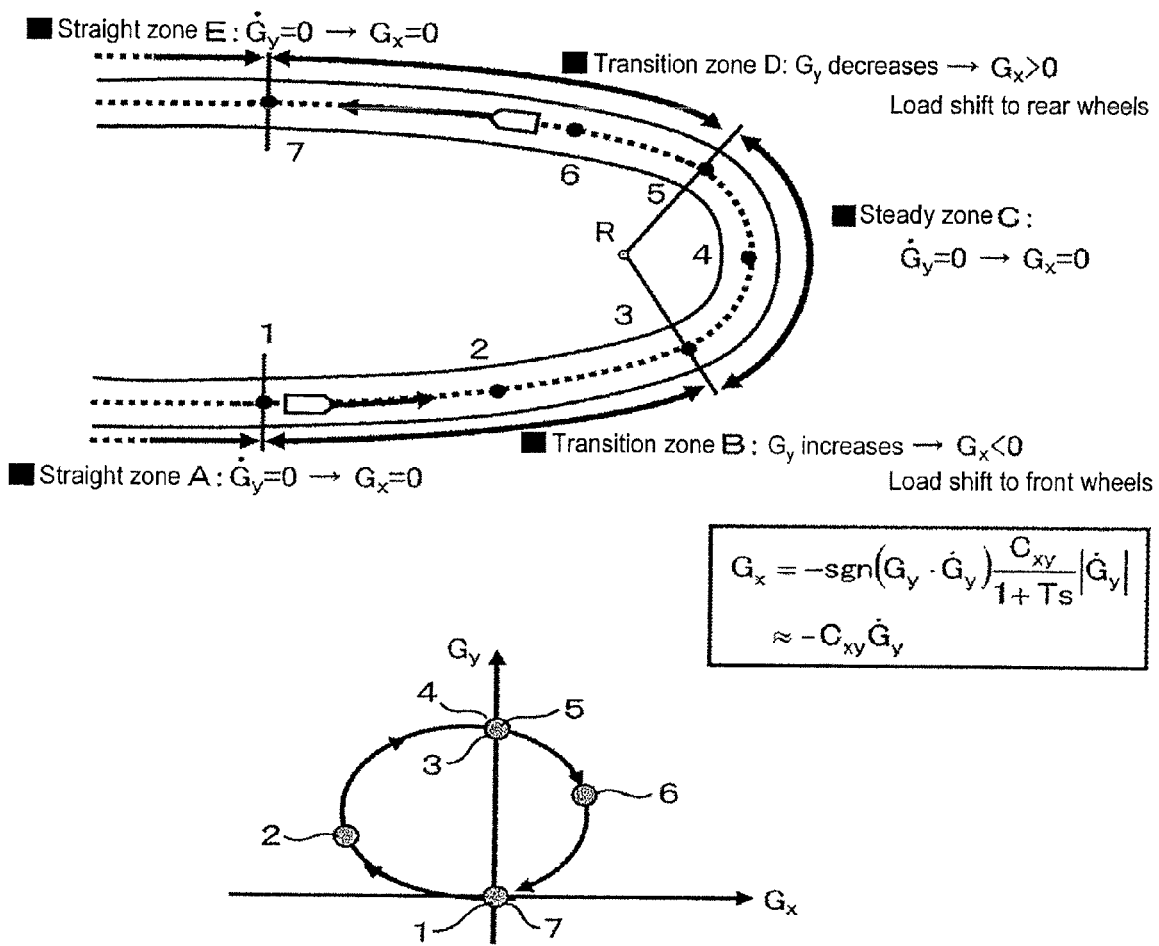
FIG. 5 is a diagram showing a process from entry to exit for a left corner with respect to a G-vectoring controlled vehicle of the present invention.

Vehicle motion with respect to a case where the control of (Eq. 1) is applied is described assuming a specific case of traveling. FIG. 5 assumes a common travel scene where a corner is entered and exited, namely, straight road A, transition zone B, steady turn zone C, transition zone D, and straight zone E. In this case, it is assumed that no acceleration/deceleration operation is performed by the driver.

Figure 6:
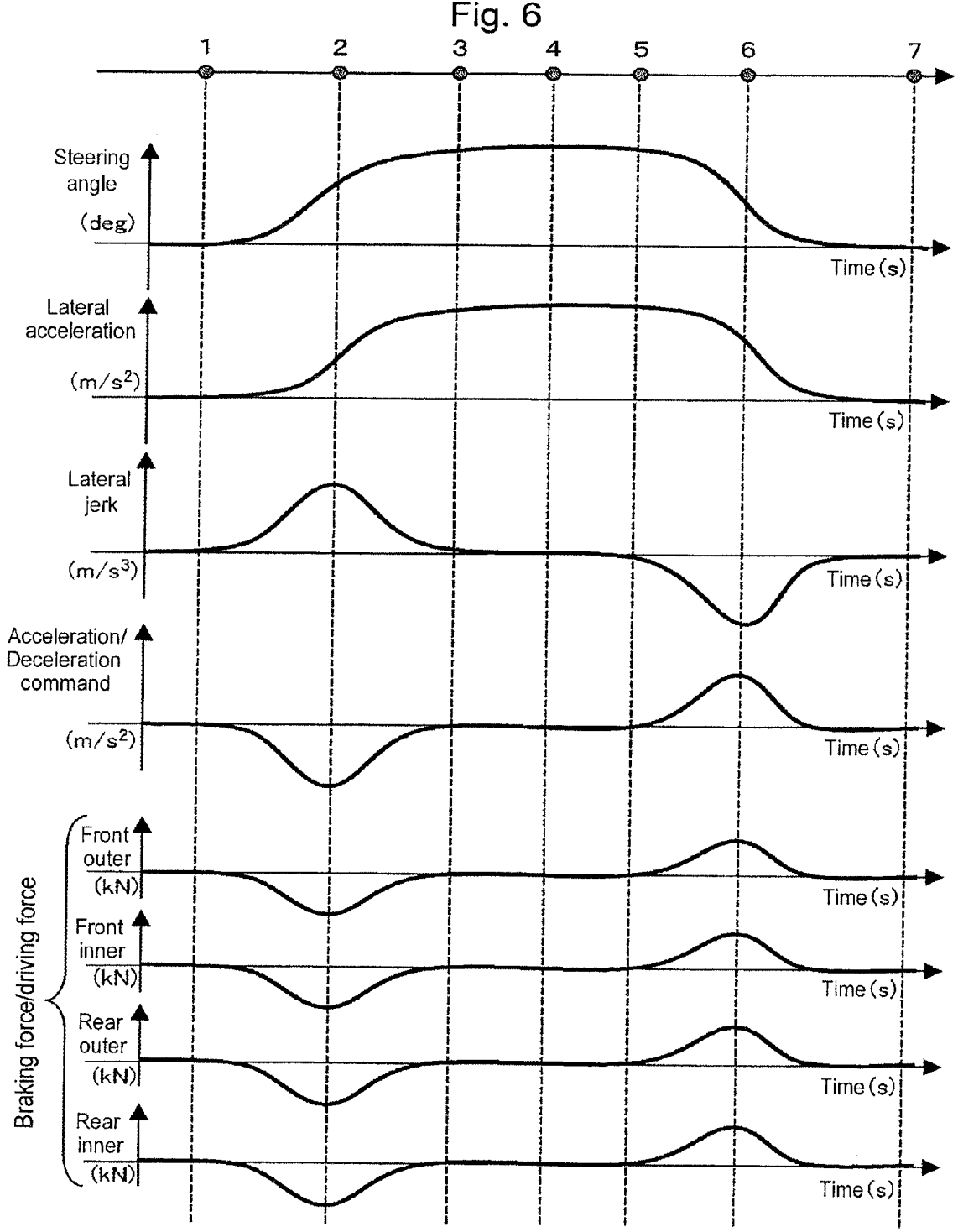
FIG. 6 shows charts indicating time series data from when the travel path in FIG. 5 is traveled.

In addition, FIG. 6 shows charts where steering angle, lateral acceleration, lateral jerk, longitudinal acceleration/deceleration control command as calculated through (Eq. 1), and the braking forces/driving forces of the four wheels (61, 62, 63, 64) are represented as time history waveforms. With respect to the front outer wheel (62 in the case of a left turn) and the front inner wheel (61), as well as the rear outer wheel (64) and rear inner wheel (63), braking forces and driving forces are so distributed as to assume the same value between the left and the right (the inner side and the outer side). This will be discussed in detail later.

The term braking force/driving force is used herein to collectively refer to forces of the respective wheels that are generated in the vehicle longitudinal direction, where braking force is defined as a force in a direction that decelerates the vehicle, and driving force as a force in a direction that accelerates the vehicle.

First, the vehicle enters the corner from straight road zone A. In transition zone B (point 1 to point 3), as the driver gradually increases steering, the vehicle's lateral acceleration $G_y$ increases. Lateral jerk $G_y\_dot$ assumes a positive value while lateral acceleration is increasing near point 2 (and returns to zero at 3, at which point lateral acceleration ceases to increase).

In this case, according to (Eq. 1), as lateral acceleration $G_y$ increases, a deceleration ($G_{xc}$ is negative) command is generated with respect to the controlled vehicle. In accordance therewith, braking forces (with a minus sign) of generally the same magnitude would be applied to the front outer, front inner, rear outer, and rear inner wheels.

Then, as the vehicle enters steady turn zone C (point 3 to point 5), the driver stops increasing steering, thereby maintaining a constant steering angle. In so doing, since lateral jerk $G_y\_dot$ becomes 0, longitudinal acceleration/deceleration control command $G_{xc}$ becomes 0. Accordingly, the braking forces/driving forces on the wheels also become zero.

Next, in transition zone D (points 5 to 7), due to the driver's easing of steering, the vehicle's lateral acceleration $G_y$ decreases. At this point, the vehicle's lateral jerk $G_y\_dot$ is negative, and, according to (Eq. 1), longitudinal acceleration/deceleration control command $G_{xc}$ is generated with respect to the controlled vehicle. In accordance therewith, driving forces (with a plus sign) of generally the same magnitude would be applied to the front outer, front inner, rear outer, and rear inner wheels.

Further, in straight zone E, lateral acceleration $G_y$ becomes 0, and lateral jerk $G_y\_dot$ also becomes zero. Consequently, no acceleration/deceleration control is performed. Thus, deceleration takes place from turn-in (point 1) upon starting steering up to the clipping point (point 3), deceleration is suspended during the steady circular turn (point 3 to point 5), and acceleration takes place from when the easing of steering starts (point 5) up to when the corner is exited (point 7). Thus, by applying G-Vectoring control to the vehicle, the driver would be able to attain an acceleration/deceleration motion that is coordinated with lateral motion by simply performing steering to make a turn.

In addition, when this motion is represented in a "g-g" diagram depicting the acceleration mode occurring with respect to the vehicle, where the horizontal axis represents longitudinal acceleration and the vertical axis lateral acceleration, a characteristic motion that transitions in a smooth and curved fashion is observed. This signifies that the longitudinal acceleration/deceleration control command is so determined as to transition in a curved fashion in the diagram with the passage of time. With respect to left corners, this curved transition would be a clockwise transition as shown in the diagram. With respect to right corners, the transition path is inverted about the $G_x$ axis, and its transition direction becomes anti-clockwise. When a transition occurs in this manner, the pitching motion that is generated with respect to the vehicle due to longitudinal acceleration is favorably coordinated with the rolling motion that is generated due to lateral acceleration, and peak values for the roll rate and pitch rate are reduced.

<Yaw Moment Control Command>

Figure 7:
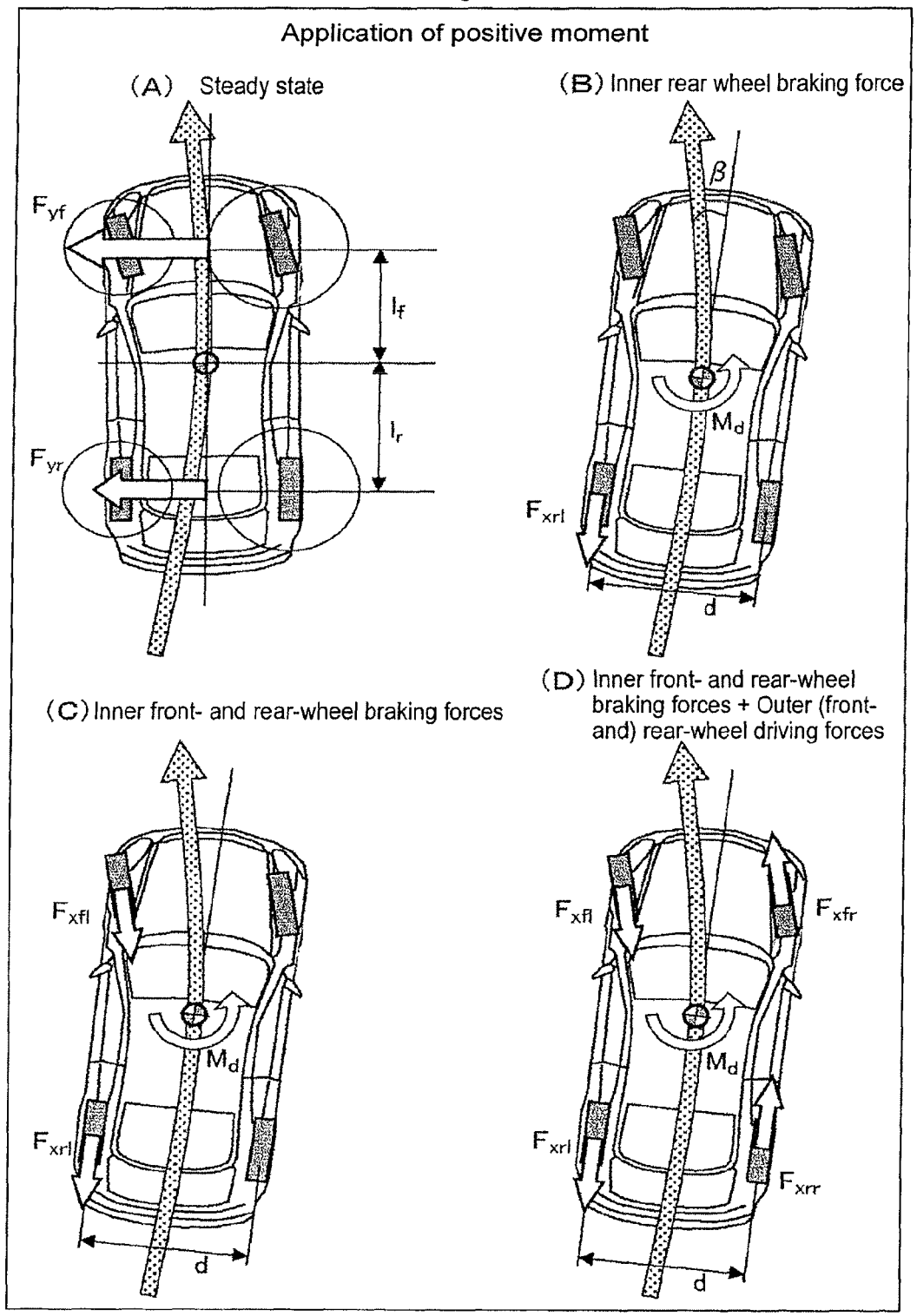
FIG. 7 is a diagram showing the application of a positive yawing moment by left and right differential braking forces/driving forces of the present invention.

Next, yaw moment control based on left/right wheel driving force/braking force distribution is briefly presented using the drawings. FIG. 7 shows schematic diagrams depicting a situation where a yaw moment in an in turning direction (positive) is inputted with respect to an anti-clockwise turn steady state (A) of the vehicle 0. First, a lateral motion equation and yawing (rotating) motion equation for the vehicle 0 in the steady state are provided below as (Eq. 4) and (Eq. 5).

[Eq. 4]

$$mG_y = F_{yf} + F_{yr} \qquad \text{(Eq. 4)}.$$

[Eq. 5]

$$M = I_z \dot{r} = 0 = F_{yf} l_f - F_{yr} l_r \quad (\text{※} \dot{r} = r\_dot) \quad \text{(Eq. 5)}.$$

where m is the mass of the vehicle 0, $G_y$ the lateral acceleration exerted on the vehicle 0, $F_{yf}$ the lateral force of the two front wheels, $F_{yr}$ the lateral force of the two rear wheels, M the yaw moment, $I_z$ the yawing moment of inertia of the vehicle 0, r_dot the yaw angular acceleration of the vehicle 0 (r being the yaw rate), $l_f$ the distance between the center of gravity of the vehicle 0 and the front axle, and $l_r$ the distance between the center of gravity of the vehicle 0 and the rear axle. During a steady circular turn, the yawing motion balances out (the yaw moment is zero), and angular acceleration becomes zero.

From this state, (B) is an example where a brake is applied only to the inner rear wheel (the left rear wheel 63) thereby imparting braking force ($F_{xrl}$), (C) is an example where, in addition to the above, a brake is also applied to the inner front wheel thereby imparting braking force ($F_{xfl}$), and (D) is an example where, in addition to (C), driving forces ($F_{xfr}$, $F_{xrr}$) are imparted to the outer front and rear wheels. In this case, the yawing moment of (Eq. 6) below would act on the vehicle 0.

[Eq. 6]

$$M_d = \frac{d}{2} \{(F_{xfr} + F_{xrr}) - (F_{xfl} + F_{xrl})\} \quad \text{(Eq. 6)}$$
$$= \frac{d}{2}(F_{xr} - F_{xl}) > 0$$

In the equation above, forces in the forward direction, i.e., the driving direction, are defined as being positive, and forces in the braking direction negative, where d represents the distance (tread) between the left and right wheels. Further, the combined braking force/driving force of the left front and rear wheels is denoted by $F_{xl}$, and the combined braking force/driving force of the right front and rear wheels by $F_{xr}$.

Figure 8:
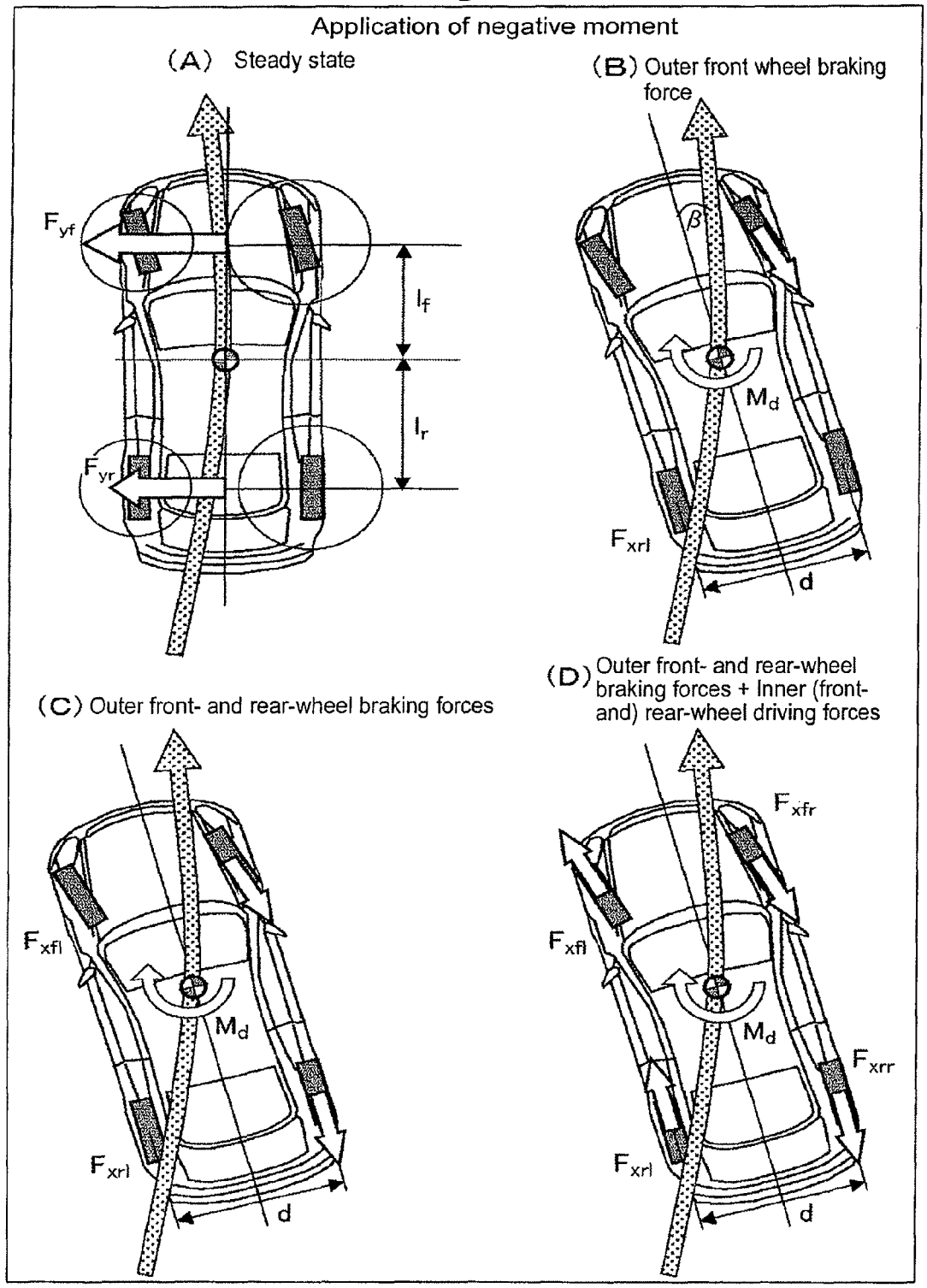
FIG. 8 is a diagram showing the application of a negative yawing moment by left and right differential braking forces/driving forces of the present invention.

Similarly, FIG. 8 shows a distribution of braking forces/driving forces that generates a negative direction, i.e., clockwise (restoring side), yaw moment when there is a negative moment, that is, when a left turn is being made. In this case, too, the equation for the yawing motion would be (Eq. 6).

With respect to the vehicle 0, since it is possible to freely generate braking and driving forces for each of the four wheels via commands by the central controller 40, both positive and negative yaw moments may be generated.

With the present invention, it is assumed that, when the vehicle's measured longitudinal acceleration $G_x$ and lateral acceleration $G_y$ are indicated in a diagram where the positive direction and negative direction of the horizontal axis respectively represent the vehicle's acceleration and deceleration, and where the positive direction and negative direction of the vertical axis respectively represent the vehicle's leftward lateral acceleration and rightward acceleration, if target yaw moment $M_t$ is a clockwise value as viewed from above the vehicle, either a greater decelerating force is imparted to the left wheels relative to the right wheels or a greater driving force is imparted to the right wheels relative to the left wheels, whereas if target yaw moment $M_t$ is an anti-clockwise value as viewed from above the vehicle, either a greater decelerating force is imparted to the right wheels relative to the left wheels or a greater driving force is imparted to the left wheels relative to the right wheels.

In addition, it is assumed that, when the vehicle's measured longitudinal acceleration $G_x$ and lateral acceleration $G_y$ are indicated in a diagram where the positive direction and negative direction of the horizontal axis respectively represent the vehicle's acceleration and deceleration, and where the positive direction and negative direction of the vertical axis respectively represent the vehicle's leftward lateral acceleration and rightward acceleration, the longitudinal acceleration/deceleration is determined in accordance with the lateral motion in such a manner that a clockwise curved transition would be observed with the passage of time when starting an anti-clockwise motion as viewed from above the vehicle, whereas an anti-clockwise curved transition would be observed with the passage of time when starting a clockwise motion as viewed from above the vehicle.

Next, with respect to a specific case of traveling, the application of such yaw moment control to "sideslip prevention" is described including an overview of the operating conditions thereof. With respect to a travel scene where a corner is entered and exited, namely, straight road A, transition zone B, steady turn zone C, transition zone D, and straight zone E, FIG. 9 shows the results of performing "sideslip prevention control" in a situation where, as provided below, "understeer" and "oversteer" occur to cause the vehicle to sideslip and fall off course.

Using the three yaw rates and the sideslip angle in FIG. 10, a brief description is provided with respect to the judgment of "understeer" and "oversteer." FIG. 10 shows charts where the steering angle, the yaw rates including estimated values and the estimated vehicle sideslip angle, which are to be used for "sideslip prevention control" intervention conditions, the yaw moment command derived from the above, the braking forces/driving forces of the four wheels (61, 62, 63, 64), and the vehicle longitudinal acceleration and lateral acceleration in this case are represented as time history waveforms.

First, yaw rate $r_\delta$ derived from steering is calculated through (Eq. 2) using stability factor A, wheel base 1, vehicle speed V, and steering angle δ. Since it takes the driver's steering angle as input, it may be said that it best reflects the driver's intention.

Next, yaw rate $r_{Gy}$ derived from lateral acceleration is calculated by omitting, as in (Eq. 3), sideslip angle change β_dot to obtain (Eq. 7), and dividing lateral acceleration by vehicle speed.

[Eq. 7]

$$r_{Gy} = \frac{G_y}{V} \quad \text{(Eq. 7)}$$

This value may be thought of as an indication of the vehicle's orbital speed, and may be thought of as a quantity indicating a vehicle turn limit.

Further, yaw rate $r_s$ sensed by the yaw rate sensor 38 indicates the actual rotating speed of the vehicle.

While sideslip angle β is by definition obtained by calculating arctan(v/u) using the vehicle's longitudinal speed u and the vehicle's lateral speed v, it may be thought of as the angle formed between the vehicle and the travel direction. By way of example, the arrows passing through the vehicle's center of gravity in FIG. 7 and FIG. 8 indicate the vehicle's travel direction, and the angle formed between that and the vehicle's longitudinal direction is the sideslip angle, where the anti-clockwise direction with respect to the vehicle fixed coordinate system is taken to be positive. FIG. 7 shows a state where the sideslip angle is negative and significant, and where oversteer→spin is induced. Conversely, FIG. 8 shows a state where the sideslip angle is positive and significant, and where understeer→path departure is induced.

Sideslip angle $\beta_\delta$ derived from steering may be calculated as in (Eq. 8) below using a vehicle motion model.

[Eq. 8]

$$\beta_\delta = \frac{1 - \frac{m}{2l}\frac{l_f}{l_r K_r}l_r}{1 + AV^2}\frac{l_r}{l}\delta \qquad \text{(Eq. 8)}$$

where m is the vehicle mass, and Kr the cornering stiffness representing the lateral force gain per unit sideslip angle of the rear wheels.

The sideslip angle may be calculated through (Eq. 9) below by independently sensing longitudinal speed $V_x$ and lateral speed $V_y$ with the millimeter wave vehicle ground speed sensor 70, or an integration method such as (Eq. 10) may be used.

[Eq. 9]

$$\beta = \arctan\left(\frac{V_y}{V_x}\right) \qquad \text{(Eq. 9)}$$

[Eq. 10]

$$\int \beta dt = \int \left(\frac{G_y}{V_x} - r\right) dt \qquad \text{(Eq. 10)}$$

Using yaw rate $r_\delta$ derived from steering, yaw rate $r_{Gy}$ derived from lateral acceleration, yaw rate $r_s$ sensed with the yaw rate sensor 38, sideslip angle $\beta_\delta$ derived from steering, and sideslip angle $\beta$ derived from sensed or estimated values, (1) "sideslip prevention control" intervention conditions and (2) yaw moment control amount are determined using a method similar to that disclosed in JP Patent Application Publication (Kokai) No. 09-315277 A (1997).

(1) Intervention Conditions

The yaw rate derived from lateral acceleration is compared with the actual yaw rate, and it is determined to be understeer when the actual yaw rate is smaller, and oversteer when greater, and, further, oversteer when the sideslip angle is negative and large. The threshold, dead zone, etc., for the above are adjusted through sensory tests on test drivers, etc.

(2) Yaw Moment Control Amount

A yaw moment is generally applied in such a manner that the yaw rate and sideslip angle derived from steering would be close to the actual values. Further, the sideslip angle derivative value, etc., are multiplied by a gain that has been so adjusted as to feel natural, and corrections are made using their sum.

The occurrence of understeer and oversteer in the present embodiment, and "sideslip prevention control" with respect thereto will now be presented using FIG. 10. First, at positions 2 and 3 in transition zone B upon entering the corner, there is a possibility that understeer may occur and that the vehicle may deviate from the course. This may be sensed from the fact that actual yaw rate $r_s$ is less than yaw rate $r_{Gy}$ derived from lateral acceleration. As such, a yaw moment command in the in turning direction (positive) is calculated. Then, in the present embodiment, a braking force is generated with respect to the left (inner) rear wheel, thereby applying a moment in the in turning direction (positive). Due to this braking force, as indicated by the longitudinal acceleration in FIG. 10 (second from the bottom), deceleration with a profile similar to that of the rear inner wheel braking force would be at work.

In addition, in steady turn zone C, in a maximum lateral acceleration state, the equivalent cornering stiffness of the rear wheels drops relatively, and oversteer occurs, thereby creating a situation likely to trigger spinning. This may be sensed from the fact that actual yaw rate $r_s$ is greater than yaw rate $r_{Gy}$ derived from lateral acceleration, and it further may be sensed from the fact that the sideslip angle has exceeded $\beta_{th}$, which is the threshold. In order to restore the excess yawing motion, in the present embodiment, a braking force is generated with respect to both the right (outer) front wheel and rear wheel, thereby applying a clockwise moment. Due to this braking force, as indicated by the longitudinal acceleration in FIG. 10 (second from the bottom), deceleration with a profile similar to that of the sum of the braking forces for the front outer wheel and the rear outer wheel would be at work.

Braking forces are distributed among the front outer wheel (62 in the case of a left turn), the front inner wheel (61), the rear outer wheel (64), and the rear inner wheel (63) so as to assume different values between the left and the right (inside and outside) only when there exists a yaw moment command.

By thus controlling braking forces (driving forces) so as to assume different values between the left and the right, it is possible to attain yaw moment control for preventing vehicle sideslip, thereby ensuring vehicle maneuverability (turnability) and stability. However, as shown in FIG. 10, in this case, deceleration would occur depending on the occurrence of sideslip. Naturally, since a change in speed, etc., would also occur, fluctuation would occur in the lateral acceleration even if the handle is steered smoothly as in FIG. 10.

When this motion is depicted in a "g-g" diagram indicating the acceleration mode occurring with respect to the vehicle, where the horizontal axis represents longitudinal acceleration and the vertical axis lateral acceleration, anti-clockwise loops would occur at two places between 1 and 5 as shown in the lower part of FIG. 9. As such, the pitching motion and the rolling motion would be asynchronous, resulting in a jerky motion as compared to the motion under G-Vectoring control in FIG. 5. It would be, so to speak, an acceleration/deceleration motion that is not coordinated with the lateral motion caused by driver input.

This is why a sense of speed loss and an unnatural feel would be caused. With respect to such problems, the present invention automatically performs acceleration/deceleration in coordination with steering operations and which operates from the normal driving region (G-Vectoring), and seeks to fuse control in which sideslip is reliably reduced in the critical driving region (sideslip prevention control), thereby causing less of an unnatural feel and enabling an improvement in safety performance. A specific control system configuration and method are disclosed below.

<Fusion of G-Vectoring Control and "Sideslip Prevention Control">

Figure 11:
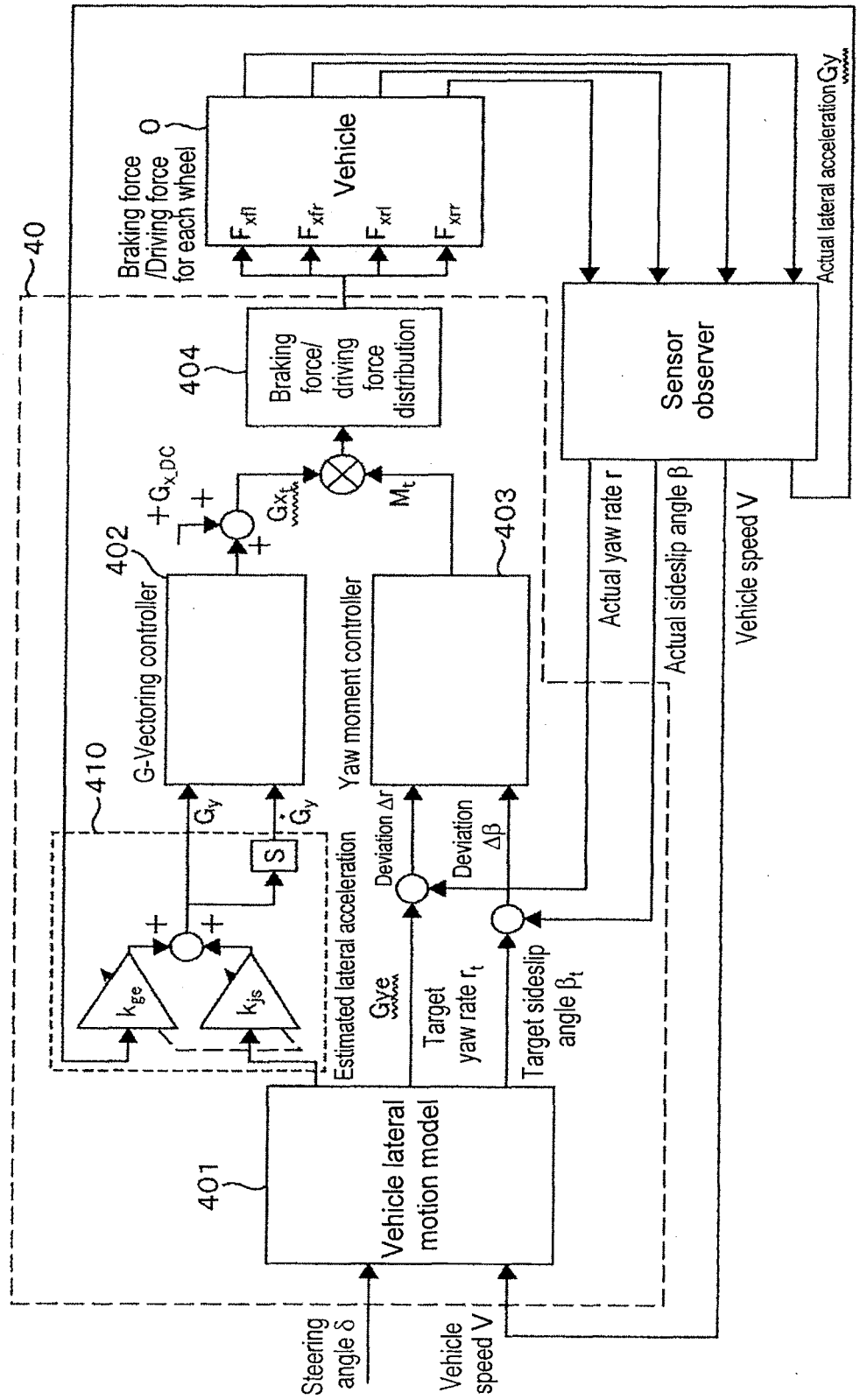
FIG. 11 is a diagram showing a control block of a vehicle motion control system according to the present invention.

FIG. 11 schematically shows the relationship between a processing control logic of the central controller 40 and an observer that estimates the sideslip angle based on the vehicle 0, a group of sensors and signals from the sensors (although processed within the central controller 40). The logic as a whole generally comprises a vehicle lateral motion model 401, a G-Vectoring controller unit 402, a yaw moment controller unit 403, and a braking force/driving force distribution unit 404.

Using (Eq. 2), (Eq. 3) or (Eq. 8), the vehicle lateral motion model 401 estimates the estimated lateral acceleration ($G_{ye}$), target yaw rate $r_t$, and target sideslip angle $\beta_t$ based on steering angle δ that is inputted from the driver steering angle sensor 33 and on vehicle speed V. In the present embodiment, the settings are such that target yaw rate $r_t$ would be equal to yaw rate $r_δ$ mentioned above which is derived from steering.

With respect to the lateral acceleration and lateral jerk to be inputted to the G-Vectoring controller 402, which is the first processing unit, a logic 410 that uses both signals in a complementary fashion as shown in FIG. 4 is adopted. The logic 410 is a logic that calculates lateral acceleration and lateral jerk based on the estimated lateral acceleration ($G_{ye}$) that has been estimated, and the actual lateral acceleration that has actually been measured.

Using the lateral acceleration and lateral jerk mentioned above and in accordance with (Eq. 1), the G-Vectoring controller 402 determines, of target longitudinal acceleration/deceleration control command $G_{xt}$, the component that is coordinated with the present vehicle lateral motion. Further, $G_{x\_DC}$, which is the deceleration component that is not coordinated with the present vehicle lateral motion, is added to calculate target longitudinal acceleration/deceleration control command $G_{xt}$, which is then outputted to the braking force/driving force distribution unit 404.

In this case, $G_{x\_DC}$ is a term that is required in cases where there is anticipatory deceleration when a corner is ahead or where there is a zone speed command. The zone speed command is information that is determined by the coordinates at which the host vehicle lies. It may therefore be determined by matching coordinate data obtained with a GPS, etc., against map information in which zone speed commands are listed. Next, as for anticipatory deceleration with respect to a corner ahead, although details of the sensing will be omitted in the present embodiment, it may be attained by a method in which, by way of example, information on what lies ahead of the host vehicle, e.g., monocular or stereo cameras, laser or millimeter wave ranging radars, GPS information, etc., is taken in, and in which acceleration/deceleration is performed in accordance with future lateral motion (lateral jerk) that has not yet become apparent. Using a path with respect to forward gaze distance and time, and deviation information with respect to anticipated host vehicle arrival position, a future steering angle is estimated in a manner similar to a so-called "driver model" that determines steering angles. Then, by performing G-Vectoring as in (Eq. 1) in accordance with future lateral jerk that is likely to be caused with respect to the vehicle due to this steering operation (Preview G-Vectoring), it becomes possible to perform anticipatory deceleration with respect to a corner ahead.

Next, with respect to the yaw moment controller 403, which is the second processing unit, in accordance with a logic such as that mentioned earlier, target yaw moment $M_t$ is calculated based on respective deviations Δr and Δβ between target yaw rate $r_t$ ($r_δ$) and the actual yaw rate, and between target sideslip angle $β_t$ and the actual (or estimated) sideslip angle, which is then outputted to the braking force/driving force distribution unit 404.

The braking force/driving force distribution unit 404 determines the braking forces/driving forces ($F_{xfl}$, $F_{xfr}$, $F_{xrl}$, $F_{xrr}$) for the four wheels of the vehicle 0 based on target longitudinal acceleration/deceleration control command $G_{xt}$ or on target yaw moment $M_t$. In the following, a basic distribution rule will first be presented. In addition to the above, the effects of indirect yaw moment control (IYC), which is characteristic of the "G-Vectoring" control of the present invention will be described generally. Characteristic points to be careful of with respect to braking force/driving force distribution will be discussed.

Figure 12:
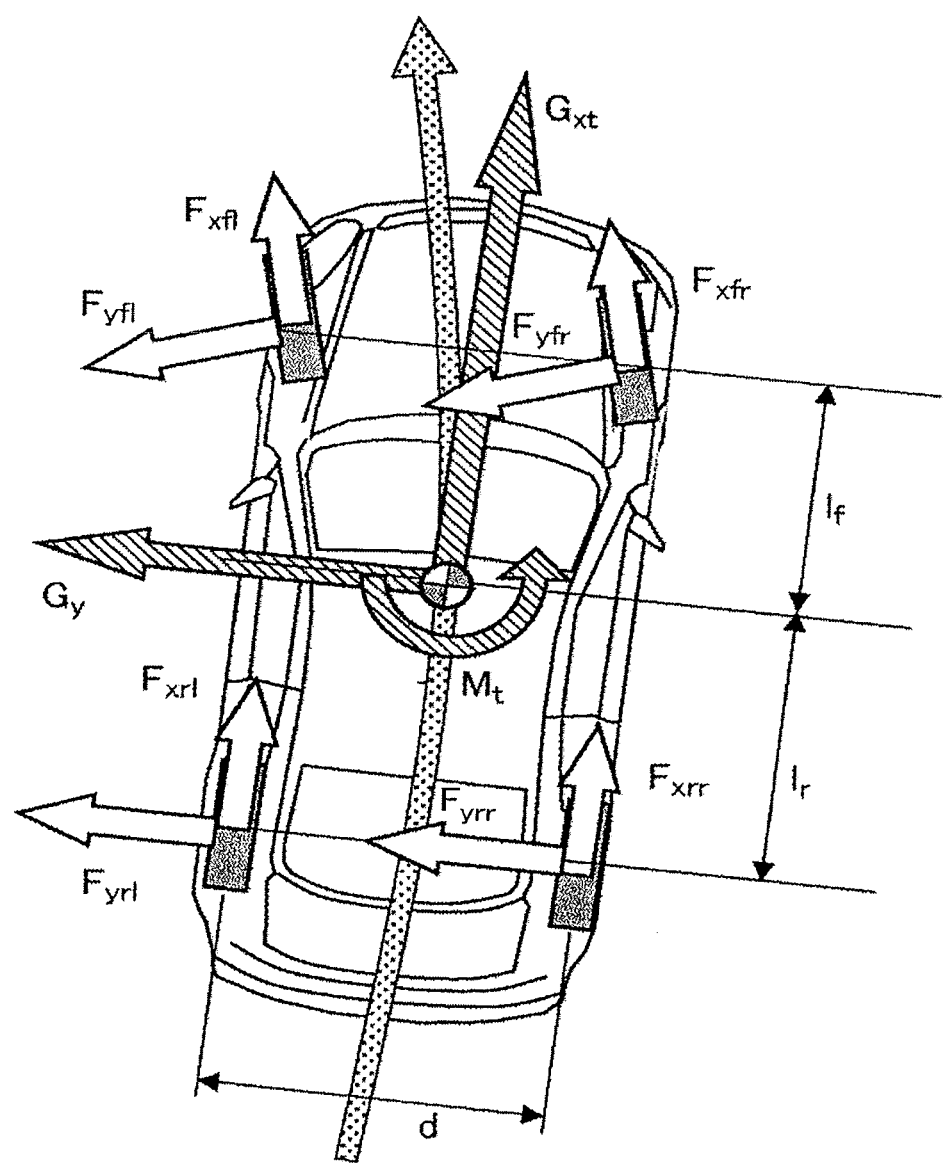
FIG. 12 is a diagram showing forces, accelerations and a yawing motion exerted on a vehicle.

First, using FIG. 12, motion equations for longitudinal motion, lateral motion, and yawing motion are considered. In order to improve the clarity of the equations, with respect to braking force/driving force and tire lateral force, the force for two wheels are redefined as in (Eq. 11), (Eq. 12), (Eq. 13), and (Eq. 14) below.

[Eq. 11]

$$F_{xr} = F_{xfr} + F_{xrr} \quad \text{(Eq. 11)}$$

[Eq. 12]

$$F_{xl} = F_{xfl} + F_{xrl} \quad \text{(Eq. 12)}$$

[Eq. 13]

$$F_{yf} = F_{yfl} + F_{yfr} \quad \text{(Eq. 13)}$$

[Eq. 14]

$$F_{yr} = F_{yrl} + F_{yrr} \quad \text{(Eq. 14)}$$

which result in (Eq. 15), (Eq. 16), and (Eq. 17) below.

<Longitudinal Motion>

[Eq. 15]

$$mG_{xt} = F_{xl} + F_{xr} \quad \text{(Eq. 15)}$$

<Lateral Motion>

[Eq. 16]

$$mG_y = F_{yf} + F_{yr} \quad \text{(Eq. 16)}$$

<Yawing Motion>

[Eq. 17]

$$I_z \cdot \dot{r} = (l_f F_{yf} - l_r F_{yr}) + \frac{d}{2}(F_{xr} - F_{xl}) \quad \text{(Eq. 17)}$$

Further, a description regarding the target yaw moment and braking forces/driving forces for the respective wheels would be as in (Eq. 18) below.

[Eq. 18]

$$M_t = \frac{d}{2}(F_{xr} - F_{xl}) \quad \text{(Eq. 18)}$$

In this case, by linking the longitudinal motion (Eq. 15) and the yawing moment (Eq. 18), they may be analytically solved as in (Eq. 19) and (Eq. 20) below with two unknowns and two equations.

[Eq. 19]

$$F_{xr} = \frac{m}{2}G_{xt} + \frac{M_t}{d} \quad \text{(Eq. 19)}$$

[Eq. 20]

$$F_{xl} = \frac{m}{2}G_{xt} - \frac{M_t}{d} \quad \text{(Eq. 20)}$$

Thus, it was possible to attain a distribution for the braking force/driving force of the two right front and rear wheels and for the braking force/driving force of the two left front and rear wheels where the longitudinal acceleration/deceleration control command based on "G-Vectoring control" and the moment command based on "sideslip prevention control" are simultaneously attained. Next, these are distributed across the front and rear wheels in accordance with the front and rear wheel vertical load ratio. Assuming now that h is the height of the sprung center of gravity of the vehicle 0 relative to the ground, and that the vehicle 0 is accelerating/decelerating due to target longitudinal acceleration/deceleration control command $G_{xt}$, then the loads ($W_f$, $W_r$) for the respective two wheels at the front and the rear would respectively be given by (Eq. 21) and (Eq. 22) below.

[Eq. 21]
$$W_f = \frac{mgl_r - mhG_{xt}}{l} \quad \text{(Eq. 21)}$$

[Eq. 22]
$$W_r = \frac{mgl_f + mhG_{xt}}{l} \quad \text{(Eq. 22)}$$

Thus, the braking forces/driving forces for the four wheels distributed in accordance with the load ratio would be given by (Eq. 23), (Eq. 24), (Eq. 25), and (Eq. 26) below.

[Eq. 23]
$$F_{xfr} = \frac{gl_r - hG_{xt}}{gl}\left(\frac{m}{2}G_{xt} + \frac{M_t}{d}\right) \quad \text{(Eq. 23)}$$

[Eq. 24]
$$F_{xfl} = \frac{gl_r - hG_{xt}}{gl}\left(\frac{m}{2}G_{xt} - \frac{M_t}{d}\right) \quad \text{(Eq. 24)}$$

[Eq. 25]
$$F_{xrr} = \frac{gl_f + hG_{xt}}{gl}\left(\frac{m}{2}G_{xt} + \frac{M_t}{d}\right) \quad \text{(Eq. 25)}$$

[Eq. 26]
$$F_{xrl} = \frac{gl_f + hG_{xt}}{gl}\left(\frac{m}{2}G_{xt} - \frac{M_t}{d}\right) \quad \text{(Eq. 26)}$$

However, (Eq. 27) and (Eq. 28) below hold true

[Eq. 27]
$$G_{xt} = -sgn(G_y \cdot \dot{G}_y)\frac{C_{xy}}{1+Ts}|\dot{G}_y| + G_{x\_DC} \quad \text{(Eq. 27)}$$

[Eq. 28]
$$M_t = M(r_\delta, r_{G_y}, r_s, \beta_t, \beta_s) \quad \text{(Eq. 28)}$$

The details of (Eq. 28) are calculated using a method similar to that disclosed in JP Patent Application Publication (Kokai) No. 09-315277 A (1997).

The above is a basic distribution rule of the present invention. Looking at (Eq. 23) through (Eq. 26), it may be construed that when the "G-Vectoring" control command value (target longitudinal acceleration/deceleration control command $G_{xt}$) is zero, the yaw moment command based on "sideslip prevention control" is distributed in accordance with the static loads on the front and rear wheels, whereas when "G-Vectoring" control command value $G_{xt}$ is not zero, the braking forces and driving forces for attaining that longitudinal acceleration are distributed across the front and the rear at the load distribution ratio with the left and right wheels being identical in value so as not to generate any excess moment.

With the central controller 40, which is a vehicle motion control system of the present invention, fusion and decoupling of "G-Vectoring control," which works from the normal region, and a "sideslip prevention system," which works in the critical region, become necessary.

When vehicle motion is considered as motion in a plane, it may be described in terms of (1) longitudinal motion, (2) lateral motion, and rotation about the center of gravity, that is, (3) yawing motion. "G-Vectoring control," which attains acceleration/deceleration that is coordinated with lateral motion, controls (1) longitudinal acceleration/deceleration, and does not directly control (3) the yawing moment. In other words, the yawing moment is "arbitrary" and has some degree of freedom.

In addition, the "sideslip prevention system" directly controls the (3) yaw moment, and does not control (1) acceleration/deceleration. In other words, longitudinal acceleration/deceleration is "arbitrary" and has some degree of freedom.

Accordingly, in order to attain fusion of these controls, one may control (1) longitudinal acceleration in accordance with an acceleration/deceleration control command coordinated with lateral motion that is determined by "G-Vectoring control" and control (3) yawing moment in accordance with a yaw moment command determined by the "sideslip prevention control system."

Specifically, a system is configured so as to have the following two modes.

(1) In the normal region where sideslip is not pronounced, braking forces/driving forces that are generally the same are generated with respect to the left and right wheels based on a "G-Vectoring control" command (first mode).

(2) As sideslip increases, braking forces/driving forces that differ between the left and the right are generated based on a yaw moment command determined through "sideslip prevention control" (second mode).

Then, when a state of the second mode is entered, if, for example, the longitudinal acceleration caused by the braking forces/driving forces of the four wheels differs from the longitudinal acceleration command determined through "G-Vectoring control," the braking forces/driving forces to be applied to the vehicle in order to generate that difference acceleration are calculated, and values obtained by evenly distributing them may be added to the left and right wheels. Thus, it is possible to attain the commanded acceleration/deceleration while maintaining the commanded yawing moment (attaining fusion and decoupling of the two controls).

In other words, the present invention is able to provide a vehicle drive control system comprising: a first mode (G-Vectoring control), in which, based on longitudinal acceleration/deceleration control command $G_{xc}$ that is coordinated with the lateral motion of the vehicle, driving forces and braking forces that are generally the same are generated with respect to the left and right wheels among the four wheels thereof; and a second mode (sideslip prevention control), in which different driving forces and braking forces are generated with respect to the left and right wheels among the four wheels based on target yaw moment $M_t$ derived from the vehicle's sideslip information (steering angle δ, vehicle speed V, yaw rate r, and sideslip angle β), wherein the vehicle drive control system causes less of an unnatural feel and enables an improvement in safety performance by being of a configuration where the first mode is selected when target yaw moment $M_t$ is equal to or less than pre-defined threshold $M_{th}$, and where the second mode is selected when the target yaw moment is greater than the threshold.

In addition, for example, in the case of two-wheel drive, or if the yaw moment is to be controlled through brake control only, there may be cases where the desired driving force cannot be generated. In such cases, the configuration is made to be such that safety is ensured by prioritizing "sideslip prevention control," and reliably generating a moment.

Regarding the fusion of "G-Vectoring control" and "sideslip prevention control" with respect to the present invention, there is one more point that should be considered, and that is the indirect yaw moment control (IYC) effect that stems from the load dependence of tire lateral force. This effect will be described generally using FIG. 13. It is assumed, for purposes of brevity, that $l_f$ (the distance from the center of gravity to the front axle) and $l_r$ (the distance from the center of gravity to the rear axle) are equal. In other words, it is assumed that the front and rear wheel loads of the front wheels and rear wheels at rest are equal.

Figure 13:
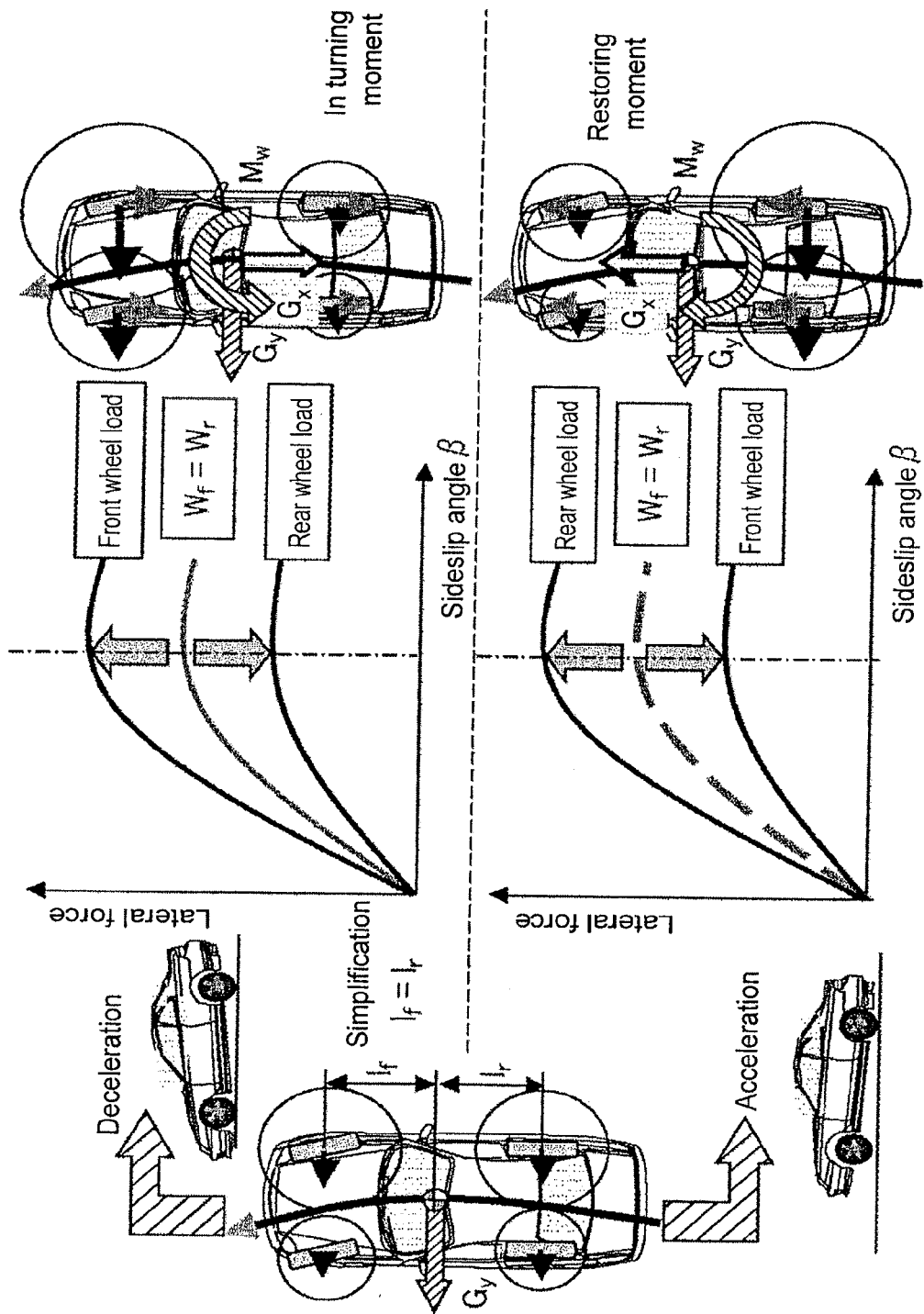
FIG. 13 is a diagram showing yaw moments resulting from load shifts by G-Vectoring control of the present invention.

As shown in FIG. 13, tire lateral force is proportional to tire sideslip angle when the sideslip angle is small, and has saturation properties when the sideslip angle is large. Since it is assumed that the loads on the front and rear wheels are equal, the same lateral force would be generated for the same sideslip angle. Assuming now that the vehicle 0 decelerates based on "G-Vectoring" control value $G_{xt}$, the front wheel load increases as indicated in (Eq. 21), and the rear wheel load decreases as indicated in (Eq. 22). As a result, if deceleration occurs while turning, lateral force $F_{yf}$ of the front wheels increases, while lateral force $F_{yr}$ of the rear wheels decreases. Considering this phenomenon based on the yawing motion equation of (Eq. 17), an in turning moment would be at work. In addition, if acceleration occurs while turning, a yaw moment on the restoring side would be at work as shown in the lower part of FIG. 13.

With respect to "G-Vectoring" control that is coordinated with lateral motion, as lateral acceleration increases, that is, as turning is started, deceleration occurs, thereby causing a yaw moment in the direction for in turning. In addition, as lateral acceleration decreases, that is, as turning is finished, acceleration occurs, thereby causing a yaw moment in the direction for restoring turning and heading straight ahead. The above indicate that they both have potential for improving maneuverability and stability.

If a yaw moment for "sideslip prevention control" were to be applied to such "G-Vectoring control," there is a possibility that failure may be caused due to excess control amounts. By way of example, this may occur when a yaw moment for understeer prevention control is inputted from the perspective of "sideslip prevention control" upon entering a corner, and "G-Vectoring" control is further applied thereto, and so forth. Another concern is that the control amount for understeer prevention may become too large, thereby going beyond neutral steer to become oversteer. A method of avoiding such situations will be described generally using the flowchart in FIG. 14.

First, vehicle speed V, yaw rate r, lateral acceleration $G_y$, lateral jerk $G_y\_dot$, sideslip angle $\beta$, and sideslip angular speed $\beta\_dot$ are sensed or estimated (step (1)), and target longitudinal acceleration/deceleration control command $G_{xt}$ that is based on G-Vectoring control rules and that is coordinated with lateral motion is calculated (step (2)). Further, (1) intervention conditions and (2) a control amount, that is, target yaw moment $M_t$, are calculated in such a manner as to reduce the vehicle's sideslip (step (3)). A short description will now be added with respect to target yaw moment $M_t$. When sideslip occurs with respect to the vehicle, sideslip also occurs with respect to the front wheels and the rear wheels. As is well-known, under such circumstances, there is generated a cornering force that is substantially proportional to cornering stiffness (unit: N/rad), which represents a tire's lateral stiffness. A combined moment of a yaw moment on the in turning side, which may be expressed as the product of the cornering force generated by the front wheels and the distance from the vehicle's center of gravity to the front axle, and of a yaw moment on the turn stopping side, which may be expressed as the product of the cornering force generated by the rear wheels and the distance from the vehicle's center of gravity to the rear axle, is a restoring yaw moment that naturally occurs with respect to the vehicle when sideslip occurs. Accordingly, if the target yaw moment command is equal to or less than the restoring yaw moment, it would naturally converge to a state with little sideslip without having to apply any yaw moment control. If control were to be applied under such conditions, it would create a subjective impression of overcontrol for the driver. In order to avoid such a phenomenon, a method is adopted where yaw moment control is not performed at or below a threshold, which is the restoring yaw moment unique to the vehicle. With existing sideslip prevention systems, test drives are repeatedly performed by test drivers, and this dead zone is set based on feeling evaluations. In other words, target yaw moment command $M_t$ calculated in step (3) represents a specific control command value for a situation where control is required and as a value in or above the dead zone (if a value simply obtained from sideslip information is in or below the dead zone, $M_t$ is made to be zero). This yaw moment command is a basic yaw moment command for a case where no acceleration/deceleration is taking place.

Next, in step (4), a determination is made as to whether or not there is a longitudinal acceleration/deceleration control command. First, a case where there is a longitudinal acceleration/deceleration control command, that is, a case where a transition to step (5) is made, will be discussed. In step (5), control rules are changed based on the magnitude of target yaw moment $M_t$. First, a comparison between target yaw moment $M_t$ and $M_{th}$, which is a pre-defined threshold, is made, and it is determined whether to perform yaw moment control where the braking and driving forces of the left and right wheels are distributed individually ((7) through (10)), or to perform only G-Vectoring (5) where generally equal braking and driving forces are distributed between the left and right wheels.

As discussed above, although the restoring yaw moment for determining the dead zone may be set roughly based on tire characteristics and vehicle specifications, tire characteristics are dependent on load as was discussed in connection with FIG. 13. Accordingly, taking into consideration the acceleration/deceleration state by G-Vectoring control, which has potential for improving maneuverability and stability, the restoring yaw moment varies in an equivalent manner from moment to moment, and the required yaw moment control amount becomes even less. As such, in the present embodiment, threshold $M_{th}$ is defined with G-Vectoring control effects taken into consideration [see Non-Patent Document 1] based on the load dependence coefficient of the tires. A comparison is then made with the absolute value of basic yaw moment command $M_t$ determined in step (3), and the configuration is such that if $M_t$ is equal to or less than $M_{th}$, acceleration/deceleration control is performed at an even distribution between the left and right wheels by G-Vectoring control (step (6)).

Figure 14:
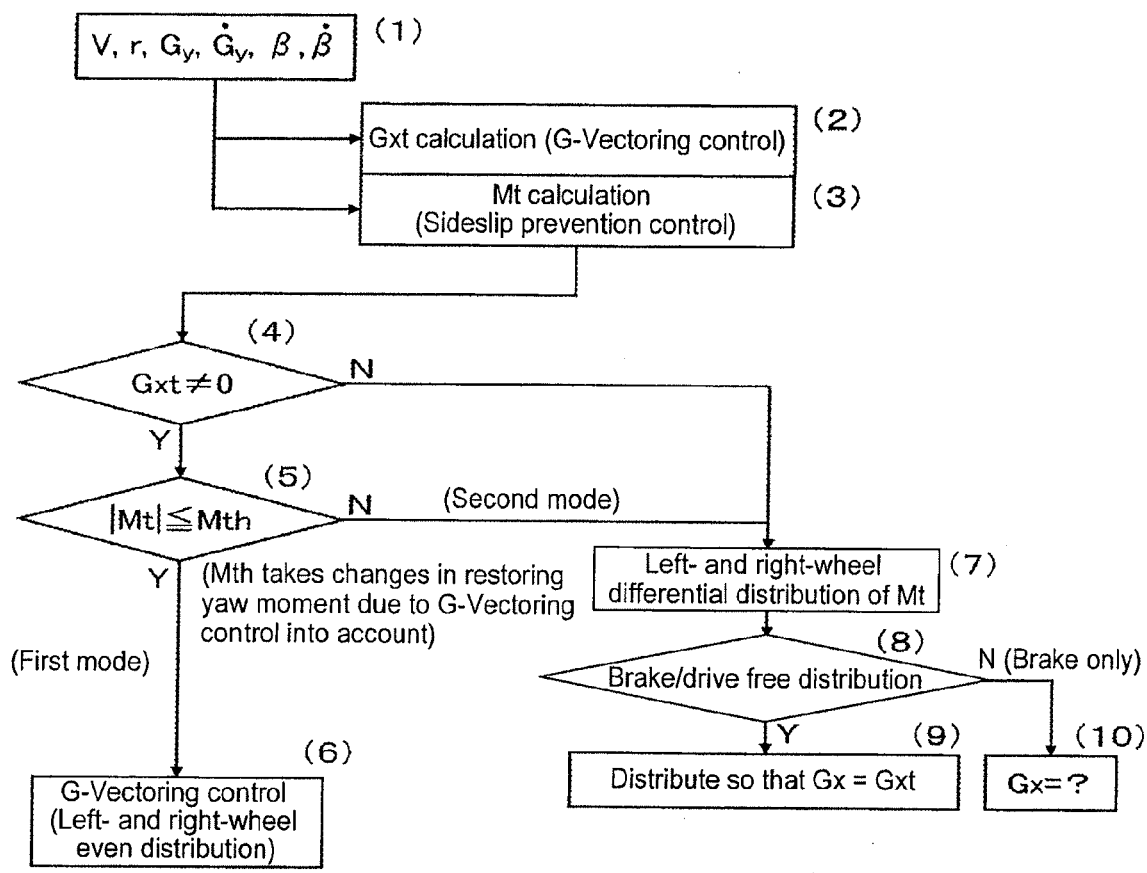
FIG. 14 is a diagram showing a flowchart for G-Vectoring control and sideslip prevention control of the present invention.

Thus, in the present embodiment, as shown in FIG. 14, the configuration is such that it includes a logic where, when G-Vectoring control is active, the left/right distribution of braking forces and driving forces is not performed unless the yaw moment control amount exceeds a given threshold. Consequently, when the yaw moment command is small, it operates in the first mode (G-Vectoring (step (6)), and when the yaw moment command is large, it operates in the second mode (side slip prevention control (steps (7) through (10)).

In addition, the vehicle longitudinal acceleration attained in the second mode (sideslip prevention control) in which different braking forces and/or driving forces are generated with respect to the left and right wheels among the four wheels is correctively controlled in such a manner that braking forces and/or driving forces that are substantially equal are applied to the left and right wheels among the four wheels so that the difference with respect to the longitudinal acceleration/deceleration control command of (G-Vectoring) becomes narrower (see also step (9) and (Eq. 23) through (Eq. 26)).

However, when other embodiments where brake/drive distribution is not at one's disposal, e.g., only brake control is performed with respect to an ordinary two-wheel-drive vehicle (N in step (8)), etc., are considered, the vehicle longitudinal acceleration attained in the second mode (sideslip prevention control) in which different braking forces and/or driving forces are generated with respect to the left and right wheels among the four wheels does not necessarily coincide with the longitudinal acceleration/deceleration control command of (G-Vectoring).

By way of example, if brake control were to be performed when the G-Vectoring command is zero, deceleration would inevitably occur (step (10)). However, when the G-Vectoring control command is greater than the deceleration caused by the sideslip prevention control command, corrective control may be performed in such a manner as to apply substantially equal braking forces and/or driving forces to the left and right wheels among the four wheels so that the difference with respect to the G-Vectoring control command would be narrower. As such, there exists a scene where a problem of the present invention is solved, and it therefore falls within the scope of the present invention.

In sum, the present invention is such that it is determined whether or not target longitudinal acceleration/deceleration control command $G_{xt}$ is zero. If target longitudinal acceleration/deceleration control command $G_{xt}$ is not zero and target yaw moment $M_t$ is equal to or less than pre-defined threshold $M_{th}$, the braking forces/driving forces ($F_{xfl}$, $F_{xfr}$, $F_{xrl}$, $F_{xrr}$) of the respective wheels of the vehicle are calculated at the braking force/driving force distribution unit 404 based on target longitudinal acceleration/deceleration control command $G_{xt}$ in such a manner that the braking forces/driving forces of the left and right wheels would be distributed in a substantially even manner. In addition, the configuration is such that, it is determined whether or not target longitudinal acceleration/deceleration control command $G_{xt}$ is zero, and if target longitudinal acceleration/deceleration control command $G_{xt}$ is zero, or if target longitudinal acceleration/deceleration control command $G_{xt}$ is not zero and target yaw moment $M_t$ is greater than pre-defined threshold $M_{th}$, the braking forces/driving forces ($F_{xfl}$, $F_{xfr}$, $F_{xrl}$, $F_{xrr}$) of the respective wheels of the vehicle are calculated at the braking force/driving force distribution unit 404 based on target yaw moment $M_t$ in such a manner that the braking forces/driving forces of the left and right wheels would be distributed individually.

Figure 15:
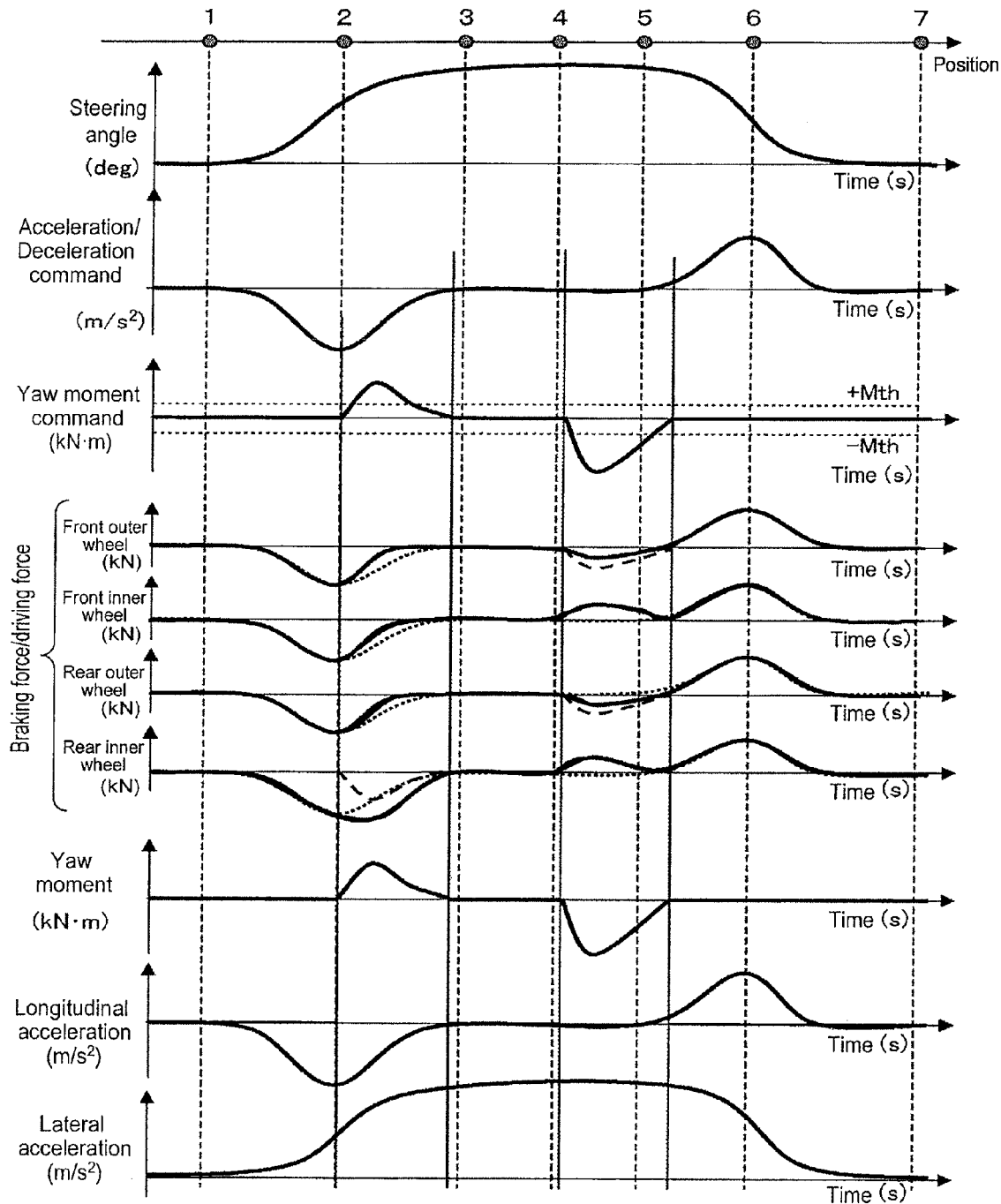
FIG. 15 shows charts indicating time series data during fused control of G-Vectoring and sideslip prevention of the present invention.
Figure 16:
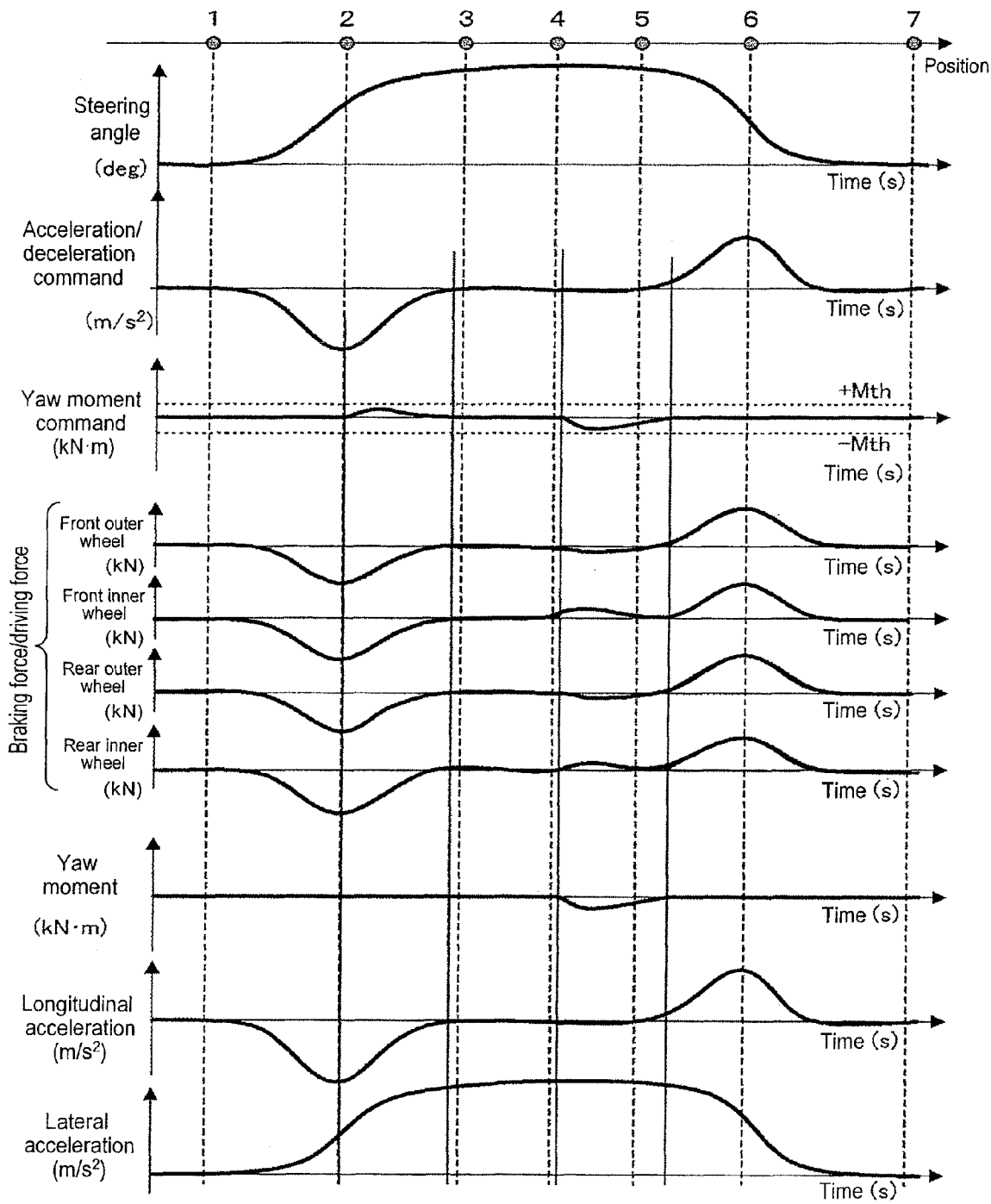
FIG. 16 shows charts indicating time series data during fused control of G-Vectoring and sideslip prevention of the present invention.
Figure 17:
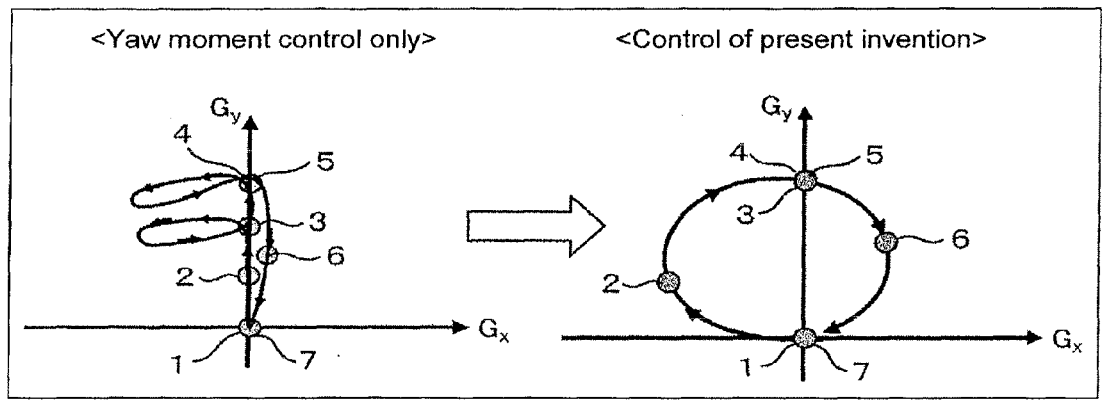
FIG. 17 is a diagram showing control effects of the present invention observed in a "g-g" diagram.

Finally, effects of the present invention will be described using FIG. 15, FIG. 16, and FIG. 17. FIG. 15, FIG. 16, and FIG. 17 are examples in which the present invention is applied to the scene shown in FIG. 9 and FIG. 10 where only "sideslip prevention control" is applied. In addition, although the locations at which "understeer" and "oversteer" occur in FIG. 16 are the same as those in FIG. 10 and FIG. 15, there is assumed a case in which there is less fluctuation in the steer characteristics.

FIG. 15 shows a longitudinal acceleration/deceleration control command, yaw moment control command, and brake/drive distribution of the respective wheels that are determined in accordance with the lateral motion that occurs in accordance with the steering angle, and the vehicle yaw moment, vehicle longitudinal acceleration, and vehicle lateral acceleration that are brought about thereby. In this case, the yaw moment commands for reducing the understeer at locations 2 to 3 and the oversteer at locations 4 to 5 are values with greater absolute values than control activating threshold $M_{th}$ in step (5) in FIG. 14 ("sideslip prevention control" is active). In the charts representing the braking forces and driving forces of the respective wheels, the dotted line is the longitudinal acceleration/deceleration control command of "G-Vectoring" control only, and the dashed line is the deceleration amount based on the yaw moment command of "sideslip prevention control." It can be seen that, through braking force/driving force distribution to which (Eq. 23) through (Eq. 26) of the present invention are applied, braking forces are applied to the four wheels over the course of locations 1 to 3, causing an in turning moment. It can further be seen that, at location 2 and onward, a significant braking force is applied only to the rear inner wheel, the braking forces of the other wheels are reduced, and longitudinal acceleration follows the "G-Vectoring" control command as net acceleration/deceleration, while the yaw moment demanded by "sideslip prevention control" is also attained. In addition, it can be seen that, at locations 4 to 5, the braking forces of the front outer wheel and rear outer wheel are reduced, driving forces are imparted to the front inner wheel and rear inner wheel, and vehicle longitudinal acceleration follows the "G-Vectoring" control command while yaw moment follows the "sideslip prevention control" command.

Likewise with respect to FIG. 16 for which a case is assumed where there is less fluctuation in the steer characteristics, a yaw moment command for reducing understeer occurs across locations 2 to 3. However, since there is a longitudinal acceleration/deceleration control command while the yaw moment command is less than threshold $M_{th}$, left/right wheel independent braking control/driving control is omitted (the same braking force for the left and right wheels, step (6) in FIG. 14). In contrast, at locations 4 to 5, there is shown an example where "sideslip prevention control" is active because, although the yaw moment command is less than threshold $M_{th}$, there is no longitudinal acceleration/deceleration control command by "G-Vectoring," and no load shift occurs among the front and rear wheels (transition from step (4) to step (7) in FIG. 14). It can be seen that because the braking forces/driving forces of the respective wheels are calculated using (Eq. 23) through (Eq. 26) of the present invention, even in this state, vehicle longitudinal acceleration follows the "G-Vectoring" control command, and yaw moment follows the "sideslip prevention control" command.

By having the braking forces and driving forces of the four wheels controlled as in FIG. 15 and FIG. 16, it is possible to attain a characteristic motion that transitions in a smoothly curved fashion in a "g-g" diagram like "G-Vectoring" control while performing yaw moment control for "sideslip prevention" as shown in FIG. 17. With respect to left corners, this curved transition would be a clockwise transition as shown in the diagram, and for right corners, the transition path becomes inverted about the $G_x$ axis, and its transition direction becomes anti-clockwise. When transitions occur in this manner, the pitching motion that occurs with respect to the vehicle due to longitudinal acceleration coordinates favorably with the rolling motion that occurs due to lateral acceleration, and the peak values for the roll rate and pitch rate are reduced. It can be seen that a technique and system that cause less of an unnatural feel and enable an improvement in safety performance are successfully realized where acceleration/deceleration that is coordinated with steering operations and that is advantageous in the normal driving region is thus performed automatically, and where sideslip is reliably reduced in the critical driving region.

It is of course necessary to consider situations in which the system or the driver issues deceleration commands such as when a vehicle ahead stops abruptly, or when information is received that there is an obstacle on the road. In such situations, it is necessary that these commands be reflected with utmost priority. This may be done through system input at the part where $G_{x\_DC}$ is added in the logic diagram in FIG. 11.

Up to this point, a situation in which the vehicle travels along a plane without any bumps has been assumed, and a technique and system that cause less of an unnatural feel and enable an improvement in safety performance have been disclosed where acceleration/deceleration that is coordinated with steering operations and that is advantageous in the normal driving region is performed automatically, and where sideslip is reliably reduced in the critical driving region. Specifically, a method of controlling the braking forces/driving forces of the respective wheels in such a manner that the vehicle motion follows both the longitudinal acceleration command and the yaw moment command has been disclosed assuming a situation in which the vehicle travels along a plane without any bumps.

Figure 18:
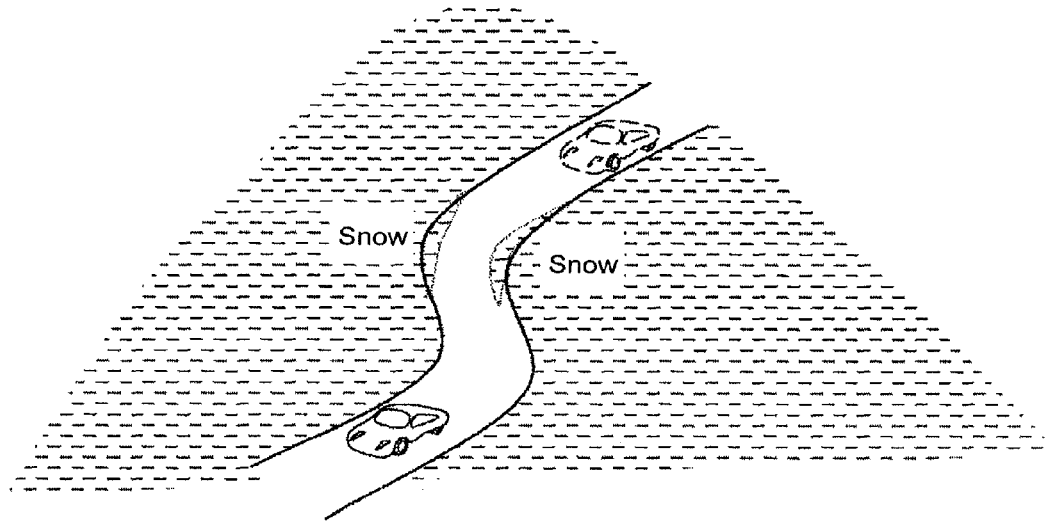
FIG. 18 is a diagram showing a situation where a mountainous area in a snowy region is being traveled.

Next, assuming a situation where a vehicle of the present invention is traveling a mountainous area in a snowy region as shown in FIG. 18, a more practical use situation of the present system is presented, and the content of what has been devised to solve practical control problems for obtaining control effects similar to those in a situation where the vehicle travels along a plane without any bumps will now be disclosed.

Figure 19:
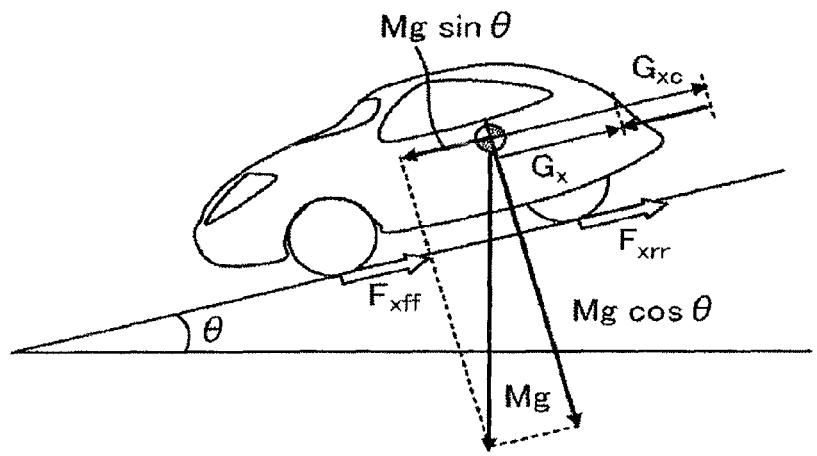
FIG. 19 is a diagram showing a situation where a slope is being descended.
Figure 20:
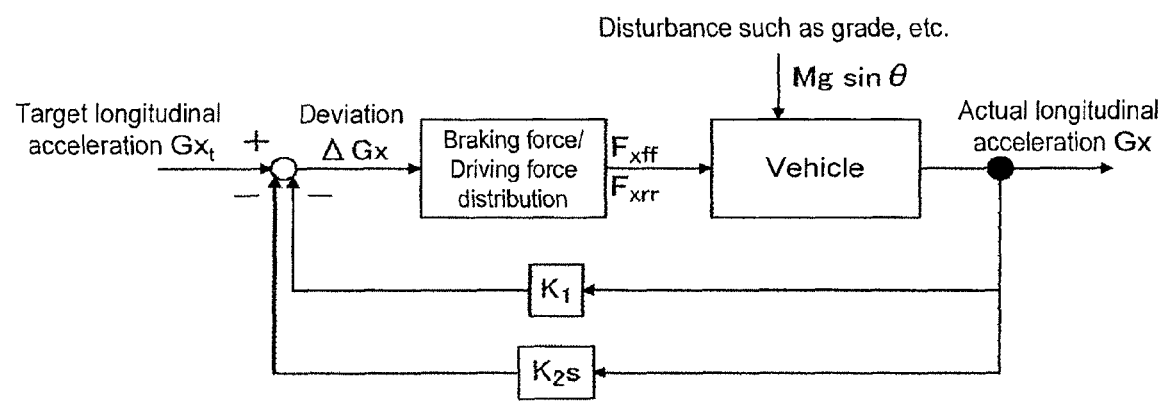
FIG. 20 is a diagram showing a longitudinal acceleration feedback loop of the present invention.

In situations like the one in FIG. 18, the following practical control problems arise.
(1) Change in vehicle longitudinal acceleration due to gravity component based on grade
(2) Sense of jerkiness in acceleration/deceleration control stemming from lateral acceleration caused by road surface bump input
(3) Change in steer response due to change in road surface characteristics With respect to each of the above, problems will be clarified and solutions with regard to the present invention will be disclosed.
(1) Change in Vehicle Longitudinal Acceleration Due to Gravity Component Based on Grade Assuming that the vehicle weight is M, when a slope having an angle of grade A is descended as shown in FIG. 19, a gravity component of $M_g \cdot \sin \theta$ would be applied to the vehicle in the longitudinal direction. If, with respect to longitudinal acceleration/deceleration control command $G_{xc}$, front wheel longitudinal force $F_{xff}$ and rear wheel longitudinal force $F_{xrr}$ were to be controlled by performing brake fluid pressure control or motor torque control, etc., with an open-loop, the actual vehicle deceleration, as opposed to the deceleration command value, would become $G_x = G_{xc} - M_g \cdot \sin \theta$, making it impossible to perform the intended control. In contrast to the above, as shown in FIG. 20, actual longitudinal acceleration $G_x$ may be measured with the longitudinal acceleration sensor 22 and be multiplied by gain K1, or be differentiated to find the longitudinal jerk, and the value obtained by multiplying it with gain K2 may be compared with target longitudinal acceleration/deceleration control command $G_{xt}$, and braking forces/driving forces $F_{xff}$ and $F_{xrr}$ may be determined based on deviation $\Delta G_x$ thereof. The "s" in K2s is the Laplace operator, and feeds back a partial derivative to improve response.

(Gain K2 in this Case is Intended to Improve Control Readiness, and is not an Essential Feature)

Further, if contemplating a system without the longitudinal acceleration sensor 22, the actual acceleration of the vehicle may be measured using, for example, derivatives of the wheel speed, and grade estimation may be performed.

By configuring such a feedback loop, it is possible to have the actual longitudinal acceleration follow the target longitudinal acceleration regardless of such disturbances as grade, etc., and control degradation may be reduced.

Thus, even in a state where a road surface with a grade is being traveled, a motion that is in accordance with the target acceleration/deceleration control command may be attained, and control effects similar to those in situations where the vehicle is traveling along a plane without any bumps may be obtained.

Figure 21:
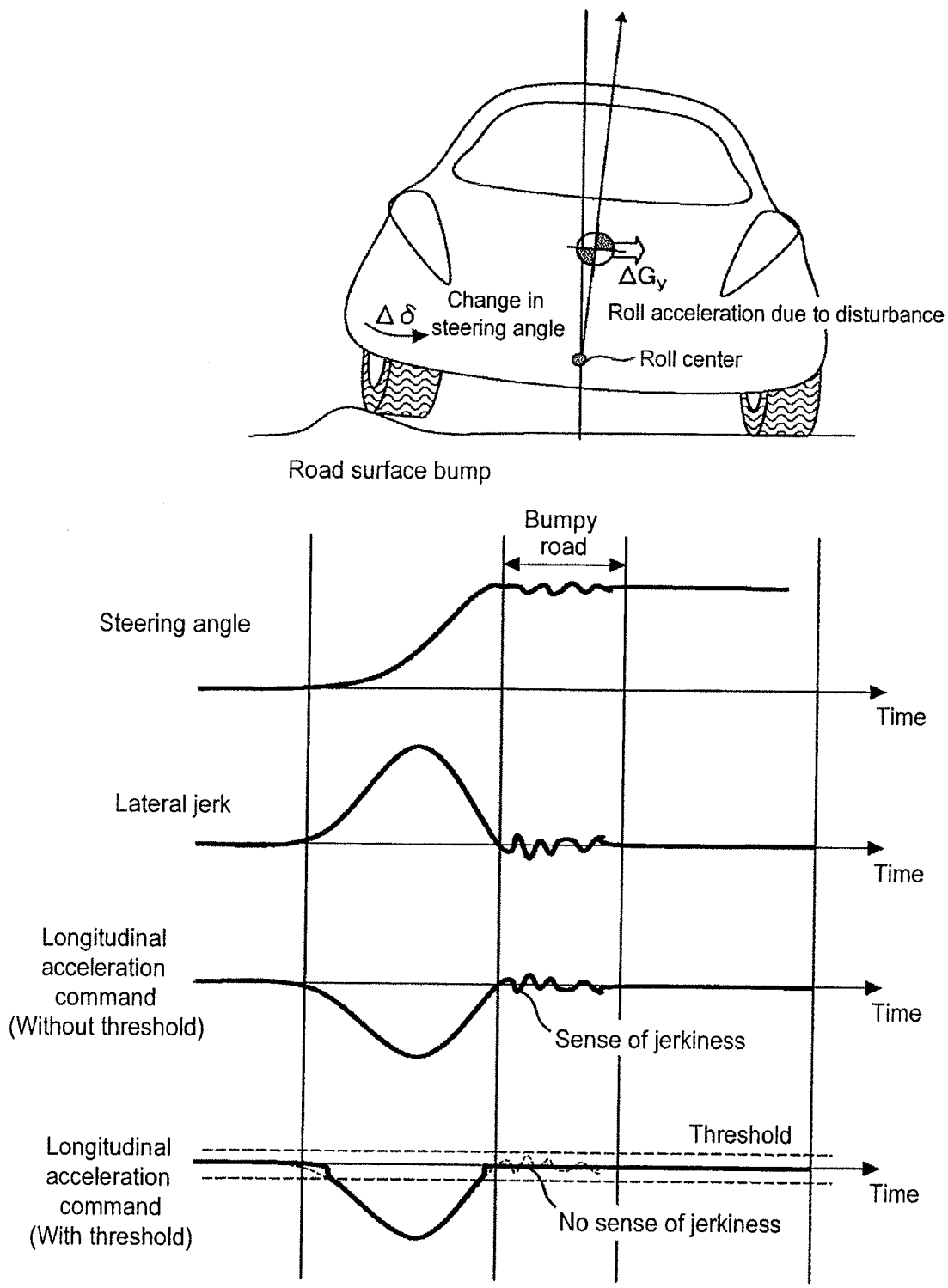
FIG. 21 is a diagram showing a situation where a bumpy road is traveled.

(2) Sense of Jerkiness in Acceleration/Deceleration Control Stemming from Lateral Acceleration Caused by Road Surface Bump Input In cases where, as shown in FIG. 21, the road surface is not flat and the road shoulder portion is covered with frozen snow, should the vehicle run onto a bumpy road, the tires on the road shoulder side would constantly be vibrated by the road surface, thereby generating small kickback torques in the driver's steering angle, and steering angle change $\Delta \delta$ would occur. In addition, small rolls would occur to cause lateral acceleration change $\Delta G_y$ at the center of gravity, and noise would consequently occur in the lateral jerk. If, under such circumstances, one were to adopt only a method such as that shown in FIG. 4, a small high-frequency component would be generated in the longitudinal acceleration as shown in the diagram. In order to avoid such a situation, the present invention is so configured as to reduce the sense of jerkiness by using a threshold and not performing control with respect to longitudinal acceleration commands that are equal to or less than the threshold. In addition, although a threshold is defined with respect to the absolute value of the longitudinal acceleration control command in the present embodiment, as an idea in which a threshold is employed with respect to frequency, actual actuator control may also be performed based on vehicle longitudinal acceleration commands that have been passed through a low-pass filter that only allows the frequency of the vehicle's lateral motion (2 Hz at most) through. It would thus be possible to reduce the sense of jerkiness in the longitudinal direction even in cases where there are bumps in the road.

(3) Change in Steer Response Due to Change in Road Surface Characteristics

Figure 2:
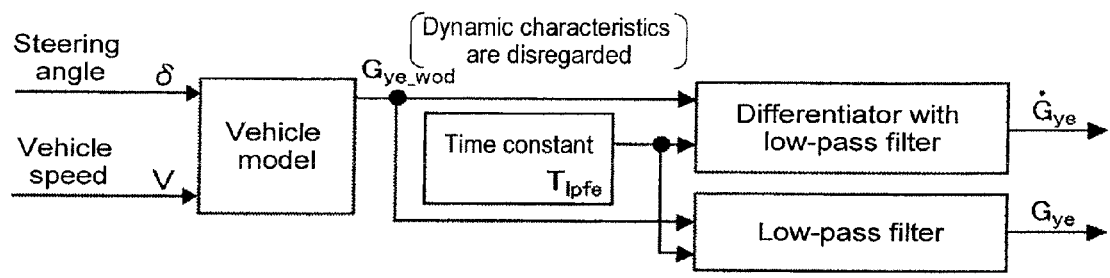
FIG. 2 is a diagram showing lateral acceleration and lateral jerk estimation using a vehicle model of the present invention.
Figure 22:
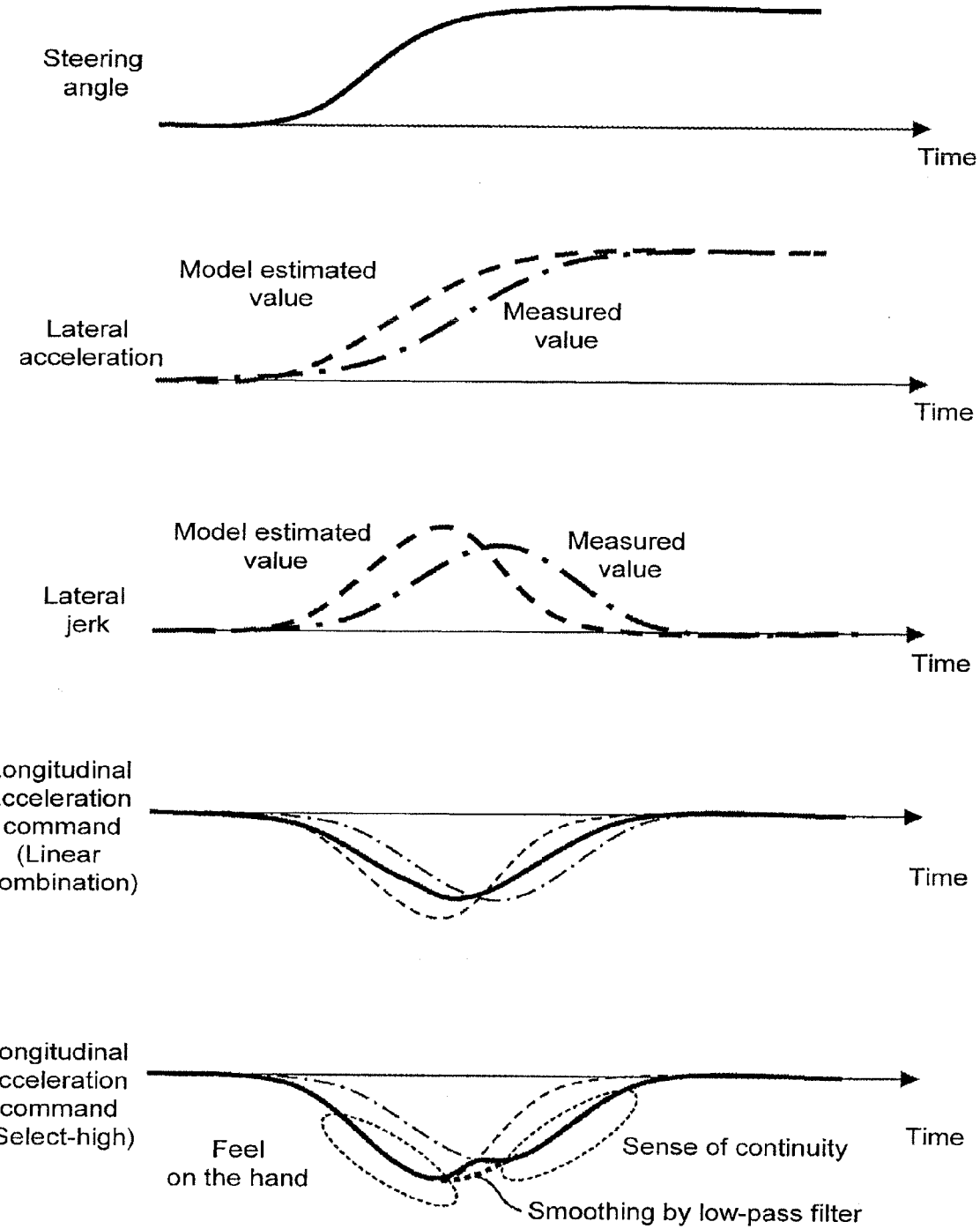
FIG. 22 shows charts indicating changes in steer response due to changes in road surface characteristics.

When the road surface traction condition changes at, for example, a snow surface as shown in FIG. 22, discrepancies in amplitude and in phase occur respectively between the lateral acceleration and lateral jerk, which are estimated using a vehicle model with respect to steering angle such as that shown in FIG. 2, and the lateral acceleration actually measured with the lateral acceleration sensor 21 and lateral jerk obtained as the time derivative thereof. In the low traction region, the measured value is slightly delayed relative to the model estimated value. In the previous embodiment, as shown in the drawings, a vehicle longitudinal acceleration command that is coordinated with lateral motion was formed using (Eq. 1) based on a linearly combined value obtained by multiplying the lateral jerk that is based on a model estimated value and the lateral jerk that is based on a measured value by a gain and summing them up. If a compacted snow road were to be traveled by a vehicle thus configured, the feel on the hand at the moment when steering is begun and the turnability would be compromised. Further, deceleration would drop while the actual lateral acceleration is still increasing, and the continuity between the rolling motion and the pitching motion would become diluted. Under such circumstances, the feel on the hand as well as a sense of continuity of motion may be simultaneously attained by choosing the longitudinal acceleration using (Eq. 1) based on a signal obtained by so-called select-high, where the one with the greater amplitude is selected from the lateral jerk based on a model estimated value, which has little response delay with respect to steering operations, and the measured lateral jerk, which is coordinated with the vehicle's actual lateral motion. In addition, the sense of continuity of motion may be further improved by smoothing the control command obtained by select-high by passing it through a low-pass filter.

Thus, there are provided a plurality of modes with distinct calculation methods for target longitudinal acceleration/deceleration control command $G_{xt}$ depending on the traveled road surface, and there is provided a switching means for switching between these plurality of modes.

Figure 23:
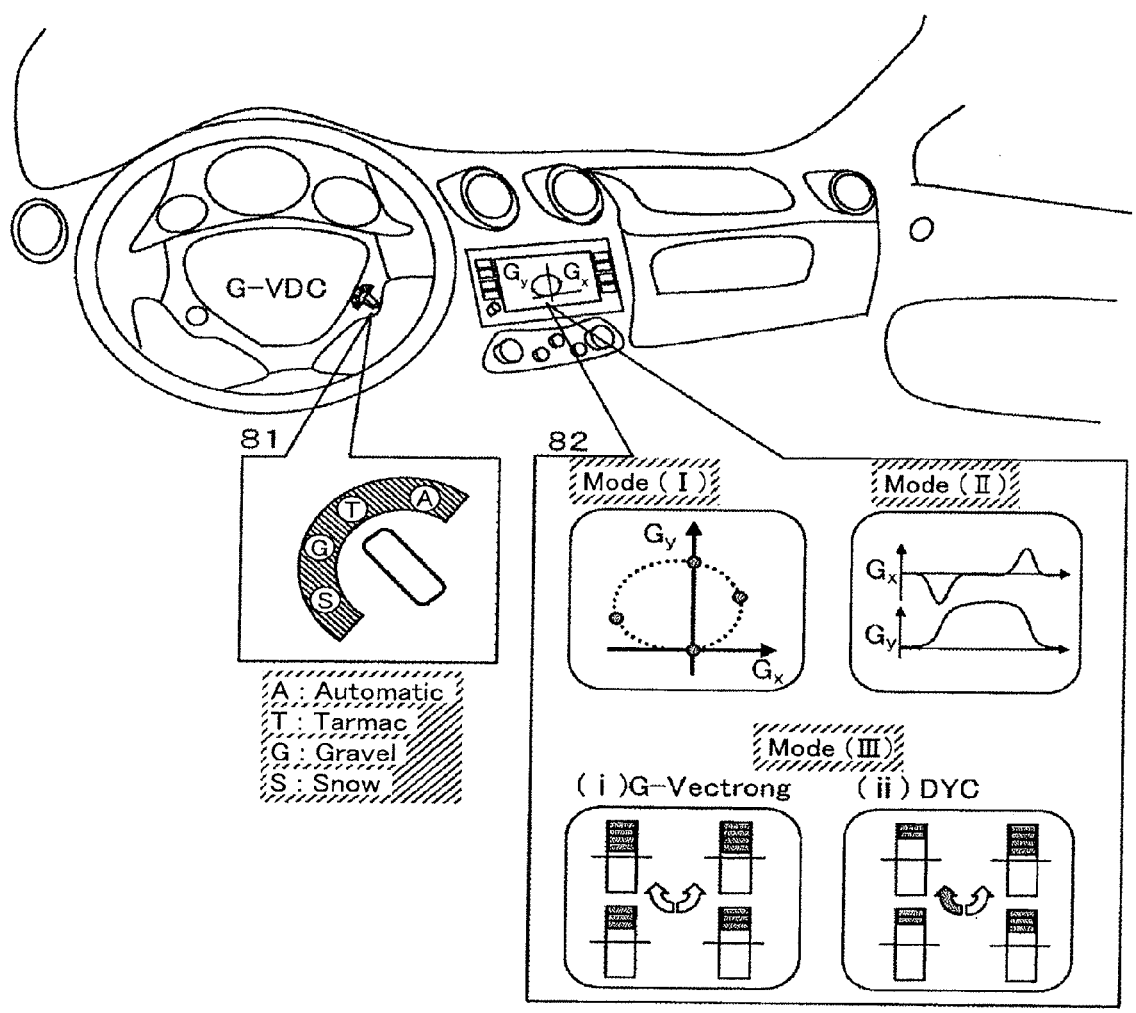
FIG. 23 is a diagram showing a control selector and multi-information display of the present invention.

As shown in FIG. 23, such switching of control modes may be done by the driver with a control selector 81 (switching means) installed within the vehicle cabin. AUTOMATIC carries out mode switching automatically, and is configured in such a manner that linear combination, select-high, and the respective gains for the lateral jerk based on a model estimated value and for the lateral jerk based on a measured value are adjusted in accordance with changes in road surface conditions, e.g., traction coefficient, etc. The configuration is such that, by way of example, braking force/driving force control is performed in accordance with a longitudinal acceleration command and the actual longitudinal acceleration is sensed, and if the actual longitudinal acceleration is significantly less than the command value, it is determined as being a case where the traction coefficient is small, and select-high control is automatically chosen, or the gain for the jerk on the model estimated value side is increased, etc., thereby improving the feel on the hand. Such mode switching and gain switching may also be of mapped formats in accordance with estimated traction coefficients. Thus, in accordance with road surface conditions, it is possible to automatically obtain good longitudinal acceleration/deceleration control commands coordinated with lateral motion. Further, although a detailed description is omitted in the present embodiment, this AUTOMATIC mode may be further divided into nimble mode in which the model estimated value jerk gain is set slightly high so that it would move nimbly in response to steering, and comfort mode in which the jerk gain based on measured values is set slightly high to attain a laid-back motion, and so forth. In addition, external information may be incorporated to change the gain and mode as emergency avoidance mode.

Further, modes other than AUTOMATIC will be briefly described. These modes are modes that the driver may choose from as desired.

TARMAC is intended mainly for use when traveling on dry paved roads, and a jerk linear combination mode is used. Since it has high responsiveness of vehicle motion with respect to steering, the model estimated lateral jerk and the lateral jerk based on measured values would be roughly the same value. In addition, it is so configured that the gain of the model estimated lateral jerk and the gain of the lateral jerk based on measured values would be roughly the same.

Next, GRAVEL is intended mainly for use when traveling on wet roads or dirt roads, and the control threshold indicated in FIG. 21 is so set as to be slightly high. In addition, although a linear combination mode is adopted, the configuration is such that steerage is improved by having the gain of the model estimated lateral jerk be slightly greater than the gain of the lateral jerk based on measured values.

Further, SNOW is intended mainly for use when traveling on snow roads, and the control threshold indicated in FIG. 21 is so set as to be slightly high even in comparison to GRAVEL. In addition, select-high control is adopted, and the gain of the model estimated lateral jerk is greater than the gain of the lateral jerk based on measured values. Thus, steerage and continuity of motion with respect to lateral motion with a delayed response are ensured.

Changes in vehicle response that accompany changes in road surface conditions greatly affect the driver's driving operation, and the vehicle motion itself also varies significantly as a result. It becomes important to perform appropriate driving operations with respect to vehicle response that varies from moment to moment. With respect to a control system of the present invention, appropriate driving operations by the driver are assisted by displaying the control state and the vehicle motion state on the multi-information display 82 within the vehicle cabin. As for display modes, there are provided a plurality of modes for indicating the present vehicle motion state and displaying reference information to help the driver make driving operation decisions, such as by indicating a "g-g" diagram where the horizontal axis represents the vehicle's longitudinal acceleration and the vertical axis the vehicle's lateral acceleration, or time series data of acceleration.

Further, the tire braking forces/driving forces, or the generated yaw moment, is/are displayed to make the control state clear, thereby indicating whether the vehicle is currently in a "G-Vectoring control state" or a "DYC state." The aim here is to make the control effect with respect to the presently generated vehicle motion clear, thereby having the vehicle driving operations by the driver be performed more appropriately. In particular, "G-Vectoring control" emulates "acceleration/deceleration operations coordinated with lateral motion" performed by an expert driver, and does not independently control the braking forces/driving forces of the four wheels. Accordingly, if the driver is able to perform comparable acceleration/deceleration driving operations, a comparable motion may be attained without any active involvement in the control by the system. It is speculated that by physically feeling his own driving operations and the vehicle motions that accompany them, and, further, seeing the control state on the multi-information display 82, the driver will more likely be able to perform "G-Vectoring control" on his own.

Thus, a control configuration in which acceleration/deceleration that is coordinated with steering operations and that is active from the normal driving region is automatically performed, and in which sideslip in the critical driving region is reliably reduced has been addressed, as well as solutions for its problems in practice. With the present invention, it becomes possible to provide a technique and system that cause less of an unnatural feel and enable an improvement in safety performance.

Further, with respect to emergency avoidance, additional notes are made below regarding the present invention's superiority in performance over conventional sideslip prevention systems.

With conventional sideslip prevention systems, left and right braking forces or driving forces would be controlled after sideslip has occurred. With respect to emergency avoidance, if the driver were to perform an abrupt steering operation in order to avoid an obstacle ahead, thereby causing understeer, the occurrence of understeer would first be awaited, and left and right braking forces would then be applied so as to cause a moment that cancels the understeer. In other words, between the occurrence of understeer and its being sensed, there would be a no brake state, and the vehicle would approach the obstacle. In contrast, with the present invention, a braking force is generated from the moment steering is started by the driver, as a result of which the speed relative to the obstacle is clearly reduced, thereby enabling a significant improvement in emergency avoidance performance.

Further, by virtue of an improvement in steer response, the absolute value of the initial steering angle for performing avoidance becomes smaller, and not as much easing of steering would be necessary after avoidance. Thus, a stable avoidance operation may be attained without voluntarily causing the vehicle response to become jerky due to steer response delay (similar effects may be attained when turning a sharp curve as well).

The invention claimed is:

1. A vehicle motion control system capable of independently controlling a driving force and braking force of four wheels of a vehicle, the vehicle motion control system comprising:
   a plurality of sensors; and
   a central controller configured to communicate with the plurality of sensors, the central controller controlling the driving and braking force of the four wheels in accordance with at least the following modes:
   a first mode in which substantially the same driving force and braking force are generated and applied to left and right wheels among the four wheels of the vehicle based on a target longitudinal acceleration/deceleration control command that is coordinated with a lateral motion of the vehicle; and
   a second mode in which different driving forces and braking forces are generated and applied to the left and right wheels among the four wheels of the vehicle based on a target yaw moment derived from sideslip information of the vehicle, wherein
   the first mode is selected when the target yaw moment is equal to or less than a pre-defined threshold, and the second mode is selected when the target yaw moment is greater than the threshold, wherein
   the target longitudinal acceleration/deceleration control command, Gxc, is determined by $$G_{xc} = -sgn(G_y \cdot \dot{G}_y)|\dot{G}_y| + G_{x\_DC}$$

(where Gy is vehicle lateral acceleration, Gy_dot is vehicle lateral jerk, Cxy is gain, T is a first-order lag time constant, s is a Laplace operator, and Gx_DC is an acceleration/deceleration command by a driver or that is automatically inputted based on external information).

2. The vehicle motion control system according to claim 1, further comprising:
   a vehicle lateral motion model that estimates estimated lateral acceleration, a target yaw rate, and a target sideslip angle based on inputted steering angle δ and vehicle speed V;
   a first processing unit that calculates the target longitudinal acceleration/deceleration control command based on lateral acceleration and lateral jerk that are calculated based on the estimated lateral acceleration and actual lateral acceleration;
   a second processing unit that calculates the target yaw moment based on a deviation between the target yaw rate and an inputted actual yaw rate, and on a deviation between the target sideslip angle and an inputted actual sideslip angle; and
   a braking force/driving force distribution unit that calculates a braking force/driving force of each wheel of the vehicle based on the target longitudinal acceleration/deceleration control command or on the target yaw moment.

3. The vehicle motion control system according to claim 2, wherein it is determined whether or not the target longitudinal acceleration/deceleration control command is zero, and if the target longitudinal acceleration/deceleration control command is not zero and the target yaw moment is equal to or less than the pre-defined threshold, a braking force/driving force of each wheel of the vehicle is calculated at the braking force/driving force distribution unit based on the target longitudinal acceleration/deceleration control command so as to distribute the braking forces/driving forces of the left and right wheels substantially evenly.

4. The vehicle motion control system according to claim 2, wherein it is determined whether or not the target longitudinal acceleration/deceleration control command is zero, and if the target longitudinal acceleration/deceleration control command is zero, or if the target longitudinal acceleration/deceleration control command is not zero and the target yaw moment is greater than the pre-defined threshold, a braking force/driving force of each wheel of the vehicle is calculated at the braking force/driving force distribution unit based on the target yaw moment so as to distribute the braking forces/driving forces of the left and right wheels individually.

5. The vehicle motion control system according to claim 1, wherein actual longitudinal acceleration during control in the second mode is correctively controlled in such a manner as to apply substantially the same braking force and/or driving force to the left and right wheels among the four wheels so as to reduce the difference relative to the target longitudinal acceleration/deceleration control command.

6. The vehicle motion control system according to claim 1, wherein the target longitudinal acceleration/deceleration control command is so determined as to transition in a curved manner in a diagram with the passage of time, the diagram being defined in such a manner that its horizontal axis represents the vehicle's longitudinal acceleration and the vertical axis the vehicle's lateral acceleration.

7. The vehicle motion control system according to claim 1, wherein the target longitudinal acceleration/deceleration control command is determined in such a manner that the vehicle decelerates as the vehicle's lateral acceleration increases, and that the vehicle accelerates as the vehicle's lateral acceleration decreases.

8. The vehicle motion control system according to claim 1, wherein the target longitudinal acceleration/deceleration control command is determined in such a manner that the vehicle decelerates as the vehicle's steering angle increases, and that the vehicle accelerates as the vehicle's steering angle decreases.

9. The vehicle motion control system according to claim 1, wherein, where the vehicle's measured longitudinal acceleration and lateral acceleration are indicated in a diagram whose horizontal axis represents the vehicle's acceleration in the positive direction and deceleration in the negative direction, and whose vertical axis represents the vehicle's leftward lateral acceleration in the positive direction and rightward acceleration in the negative direction, if the target yaw moment is a clockwise value as viewed from above the vehicle, a greater deceleration force is imparted to the left wheels than the right wheels or a greater driving force is imparted to the right wheels than the left wheels, and if the target yaw moment is an anti-clockwise value as viewed from above the vehicle, a greater deceleration force is imparted to the right wheels than the left wheels or a greater driving force is imparted to the left wheels than the right wheels.

10. The vehicle motion control system according to claim 6, wherein, where the vehicle's measured longitudinal acceleration and lateral acceleration are indicated in a diagram whose horizontal axis represents the vehicle's acceleration in the positive direction and deceleration in the negative direction, and whose vertical axis represents the vehicle's leftward lateral acceleration in the positive direction and rightward acceleration in the negative direction, longitudinal acceleration/deceleration is determined in accordance with lateral motion in such a manner as to exhibit a clockwise curved transition with the passage of time if an anti-clockwise motion is started as viewed from above the vehicle, and to exhibit an anti-clockwise curved transition with the passage of time if a clockwise motion is started as viewed from above the vehicle.

11. The vehicle motion control system according to claim 1, wherein the sideslip information of the vehicle comprises a steering angle, a vehicle speed, a yaw rate, and a sideslip angle.

12. The vehicle motion control system according to claim 2, wherein the braking force/driving force distribution unit calculates the braking force and/or driving force of each wheel of the vehicle based on a deviation between the target longitudinal acceleration/deceleration control command and a value obtained by multiplying measured actual longitudinal acceleration by a pre-defined gain or by differentiating the measured actual longitudinal acceleration.

13. The vehicle motion control system according to claim 2, wherein the target longitudinal acceleration/deceleration control command is determined using one of lateral jerk calculated using the estimated lateral acceleration estimated with the vehicle lateral motion model and actual lateral jerk obtained by differentiating the vehicle's actually measured lateral acceleration.

14. The vehicle motion control system according to claim 2, further comprising:
 a plurality of modes with varying calculation methods for the target longitudinal acceleration/deceleration control command; and
 switching means for switching between the plurality of modes.

15. The vehicle motion control system according to claim 14, wherein the plurality of modes are modes of calculation methods for the target longitudinal acceleration/deceleration control command that vary in accordance with a traveled road surface.

16. The vehicle motion control system according to claim 14, wherein the switching means comprises a control selector that is provided within the vehicle and that is switchable through driver operation.

* * * * *

UNITED STATES PATENT AND TRADEMARK OFFICE
CERTIFICATE OF CORRECTION

PATENT NO.        : 8,989,981 B2
APPLICATION NO.   : 14/248863
DATED             : March 24, 2015
INVENTOR(S)       : Yamakado et al.

It is certified that error appears in the above-identified patent and that said Letters Patent is hereby corrected as shown below:

In the claims

Claim 1 at column 27, lines 56-62, should read as follows:

the target longitudinal acceleration/deceleration control command, Gxc, is determined by $$G_{xc} = -\text{sgn}(G_y \cdot \dot{G}_y) \frac{C_{xy}}{1 + Ts} |\dot{G}_y| + G_{x\_DC}$$

Signed and Sealed this
Sixth Day of October, 2015

Michelle K. Lee
*Director of the United States Patent and Trademark Office*